(12) United States Patent
Watanabe et al.

(10) Patent No.: US 9,946,896 B2
(45) Date of Patent: Apr. 17, 2018

(54) ATTRIBUTE INFORMATION PROVISION METHOD AND ATTRIBUTE INFORMATION PROVISION SYSTEM

(71) Applicant: HITACHI, LTD., Tokyo (JP)

(72) Inventors: Natsuki Watanabe, Tokyo (JP); Kosuke Anzai, Tokyo (JP); Katsuaki Nakahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 194 days.

(21) Appl. No.: 15/024,527

(22) PCT Filed: Oct. 14, 2014

(86) PCT No.: PCT/JP2014/077309
§ 371 (c)(1),
(2) Date: Mar. 24, 2016

(87) PCT Pub. No.: WO2015/060157
PCT Pub. Date: Apr. 30, 2015

(65) Prior Publication Data
US 2016/0217301 A1 Jul. 28, 2016

(30) Foreign Application Priority Data
Oct. 25, 2013 (JP) ................. 2013-221834

(51) Int. Cl.
*G06F 21/62* (2013.01)
*H04L 29/06* (2006.01)
(Continued)

(52) U.S. Cl.
CPC .......... *G06F 21/6245* (2013.01); *G06F 21/62* (2013.01); *H04L 63/0407* (2013.01);
(Continued)

(58) Field of Classification Search
CPC ................ G06F 21/60; G06F 21/6245; G06F 17/30283; H04L 63/10
See application file for complete search history.

(56) References Cited

U.S. PATENT DOCUMENTS

2007/0088753 A1* 4/2007 Omoto ................ G06F 21/6245
2013/0061225 A1* 3/2013 Nakagawa .......... G06F 9/45558
718/1

FOREIGN PATENT DOCUMENTS

WO 2011/070726 A1 6/2011

* cited by examiner

*Primary Examiner* — David J Pearson
(74) *Attorney, Agent, or Firm* — Volpe and Koenig, P.C.

(57) ABSTRACT

A user attribute information provision system processes attribute information of users while preventing a leakage of attribute information. A provision apparatus: selects an apparatus group forming a communication path; generates information registration request in which information of a predetermined user is concealed in data recognizable only to a correspondent of the provision apparatus; and transmits the information registration request to an access destination solving apparatus via the apparatus groups. The access destination solving apparatus: stores the information of the user indicated by the information registration request and information of a correspondent provision apparatus; receives an inquiry request from an inquiry apparatus; and transfers the inquiry request by way of the correspondent provision apparatus as the user to the provision apparatus as the inquiry destination via the provision apparatuses in the communication path, thereby causing the provision apparatus to return the attribute information of the user to the inquiry apparatus.

9 Claims, 21 Drawing Sheets

(51) Int. Cl.
 *H04L 29/08* (2006.01)
 *G06F 17/30* (2006.01)
(52) U.S. Cl.
 CPC .......... *H04L 63/101* (2013.01); *H04L 67/306* (2013.01); *G06F 17/30283* (2013.01); *G06F 2221/2107* (2013.01)

| USER ID | ROUTE IDENTIFIER | DELETION PASSWORD | NEXT NODE PROVISION APPARATUS |
|---|---|---|---|
| A-Sato | Route1 | r_2Bif | P1 |
| A-Suzuki | Route2 | ZBWdcV | P4 |
| A-Takahashi | Route3 | yt-ZiL | P2 |

FIG.7

| USER ID | ROUTE IDENTIFIER | DELETION PASSWORD |
|---|---|---|
| P3-Sato | Route1 | r_2Bif |
| P3-Suzuki | Route5 | ZBWdcV |
| P3-Takahashi | Route6 | yt-ZiL |

FIG.8

| USER ID | ROUTE IDENTIFIER | DELETION PASSWORD | NEXT NODE PROVISION APPARATUS | REGISTRATION DATE | DELETION DATE | GROUP |
|---|---|---|---|---|---|---|
| A-Sato | Route1 | r_2Bif | P1 | 2009/05/18 | 2012/05/12 | LOCAL GOVERNMENT |
| A-Suzuki | Route2 | ZBWdcV | P4 | 2009/09/13 | 2012/02/15 | LOCAL GOVERNMENT |
| A-Takahashi | Route3 | yt-ZiL | P2 | 2009/08/30 | - | LOCAL GOVERNMENT |
| A-Sato | Route4 | mS5Lxs | P10 | 2009/09/29 | 2012/02/15 | MEDICAL INSTITUTION |

| USER ID | ROUTE IDENTIFIER | DELETION PASSWORD | NEXT NODE PROVISION APPARATUS | REGISTRATION PASSWORD |
|---|---|---|---|---|
| A-Sato | Route1 | r_2Bif | P1 | nafx67 |
| A-Suzuki | Route2 | ZBWdcV | P4 | 4BTfJ7 |
| A-Takahashi | Route3 | yt-ZiL | P2 | 9crXHQ |

FIG.23

ATTRIBUTE INFORMATION PROVISION METHOD AND ATTRIBUTE INFORMATION PROVISION SYSTEM

TECHNICAL FIELD

The present invention relates to an attribute information provision method and an attribute information provision system. More particularly, the present invention relates to a technique for enabling a user attribute information provision system in which multiple information processing apparatuses cooperate with each other, to perform various processings related to attribute information of a user while preventing a leakage of the attribute information of the user by concealing a correspondence relationship between the user and an information providing entity holding the attribute information.

BACKGROUND ART

For information systems of entities such as local governments, administrative agents, and private-sector institutions, studies have been in progress on inquiry and provision of users' attribute information among the entities for the purpose of improving the users' convenience and work efficiency. Attribute information of the user to be inquired and provided in the above case includes sensitive information which is personal information (various kinds of information such as name, address, tax payment and medical history) of the users.

In this regard, ID-WSF (Identify Web Service Framework) is provided as typical specifications for cooperative handling of such sensitive information among entities by implementing inquiry and provision of attribute information based on the agreement of the user. In ID-WSF, attribute information is inquired and provided among entities such as: a WSP (Web Service Provider) that is an information providing entity managing and providing attribute information of the user; a WSC (Web Service Consumer) that is an information inquiring entity providing services to the user by using the inquired attribute information of the user; and a DS (Discovery Service) that is a coordination apparatus providing a solution about the access destination, that is, determining which the WSP to inquire to when WSC inquires attribute information of a specific user.

In ID-WSF, the DS needs to manage associations between users and WSPs in order to give a response to a WSC. Therefore, there is a problem that a leakage of personal information on the user may occur if information associating the users and the WSPs with each other is leaked by an attacker outside the DS or by a malicious person inside the DS. For example, when a WSP associated with a user is a specialized medical institution, it may be presumed that the user has a disease specialized by the medical institution, and thereby the user's disease case may be leaked to the outside.

In view of the foregoing problems, for example, there is a proposed method in which all DSs prepare and share information of lists of users to whom each DS may provide solution, and even when a WSC inquires to any DS, the DS may send a response indicating another DS capable of providing solution about a WSP (see Patent Document 1). That is, upon receiving a request from a WSC, a DS determines whether the DS may provide a solution about the WSP. If providing the solution is not possible, the DS searches the shared information to find information of another DS that may provide a solution from, and returns the information of the found DS. The WSC, which has acquired the information of the DS as an inquiry result, inquires to the acquired DS and acquires information on the WSP.

Thus, even when WSC makes an inquiry to any DS, the WSC can obtain information on WSP easily. Also, since multiple DS holds the relations between the users and WSPs in a distributed manner, the leakage of a large amount of personal information at one time may be prevented.

CITATION LIST

Patent Literature

[PTL 1] International Publication No. WO2011/070726

SUMMARY OF THE INVENTION

Technical Problem

According to the conventional technique mentioned above, all DSs prepare and share with each other information of lists of users to whom each DS may provide a solution, and thereby one DS holds a less number of WSPs holding the user's attribute information. However, since each DS holds information associating the users and WSPs with each other, risk of the leakage of the information is not reduced.

Also, assuming that an administrator of a DS acts wrong, he/she may collect a record of WSP's registration of the correspondence relationship between a user and a WSP to the DS, or a record of WSC's inquiry about information of a WSP to the DS. Thus, there remains a concern that personal information may be leaked at the time of information registration and information inquiry.

In view of the above, it is an object of the present invention to provide a technique capable of preventing the leakage of the attribute information of the user by concealing a correspondence relationship between the user and an information providing entity holding the attribute information thereof when performing various processings related to the user attribute information in a user attribute information provision system in which multiple information processing apparatuses cooperate with each other.

Solution to Problem

An attribute information provision method according to the present invention to solve the problems, comprises, by a provision apparatus configured to provide attribute information on a user of a predetermined entity, selecting a plurality of provision apparatuses from other provision apparatuses on a network as an apparatus group forming a communication path of the attribute information by sequentially repeating data transfer through the provision apparatuses, and generating an information registration request in which information of a predetermined user is concealed in data recognizable only to a correspondent provision apparatus among the other provision apparatuses of the apparatus group; and transmitting the information registration request via the apparatus group to an access destination solving apparatus configured to manage a communication path between the provision apparatus and an inquiry apparatus that is to use the attribute information, and, by the access destination solving apparatus, receiving the information registration request, and storing the information of the user indicated by the information registration request and information of a provision apparatus in the apparatus group that has transmitted the information registration request directly to the access destination solving apparatus and that is a correspondent in a subsequent processing related to the information registration request, into a storage device; and receiving an inquiry request of a provision apparatus as an inquiry destination for attribute information of a predetermined user from the inquiry apparatus, and transferring the inquiry request by way of the correspondent provision apparatus registered for the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

Further, the attribute information provision system of the present invention includes: a provision apparatus including a communication unit configured to communicate with other devices, a storage unit configured to store attribute information on a user of a predetermined entity, and a processing unit configured to perform a processing of selecting a plurality of provision apparatuses from other provision apparatuses on a network as an apparatus group forming a communication path of the attribute information by sequentially repeating data transfer through the provision apparatuses, and generating an information registration request in which information of a predetermined user is concealed in data recognizable only to a correspondent provision apparatus among the other provision apparatuses of the apparatus group; and transmitting the information registration request via the apparatus group to an access destination solving apparatus configured to manage a communication path between the provision apparatus and an inquiry apparatus that is to use the attribute information; and an access destination solving apparatus including a communication unit configured to communicate with other devices, a processing unit configured to perform a processing of receiving the information registration request from the provision apparatus, and storing information of the user indicated by the information registration request and information of a provision apparatus that has directly transmitted the information registration request to the provision apparatus out of the apparatus groups and that is a correspondent in subsequent processings related to the information registration request, into a storage device, and a processing of receiving an inquiry request of a provision apparatus as an inquiry destination for attribute information of a predetermined user from the inquiry apparatus, and transferring the inquiry request by way of the correspondent provision apparatus registered for the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

Advantageous Effects of Invention

According to an aspect of the present invention, a leakage of attribute information may be prevented by concealing a correspondence relationship between a user and an information providing entity holding attribute information thereof when performing various processings related to the user's attribute information in a user attribute information provision system in which multiple information processing apparatuses cooperate with each other.

BRIEF DESCRIPTION OF THE DRAWINGS

FIG. 7 is a diagram showing a configuration example of a table stored in a provision apparatus response data holding part according to the first embodiment.

FIG. 8 is a diagram showing a configuration example of a table example 1 stored in the attribute information holding part according to the first embodiment.

FIG. 20 is a diagram showing a configuration example of a table stored in a provision apparatus response data holding part according to a third embodiment.

FIG. 23 is a diagram showing a configuration example of a table stored in a provision apparatus response data holding part according to the fourth embodiment.

DESCRIPTION OF EMBODIMENTS

Figure 1:
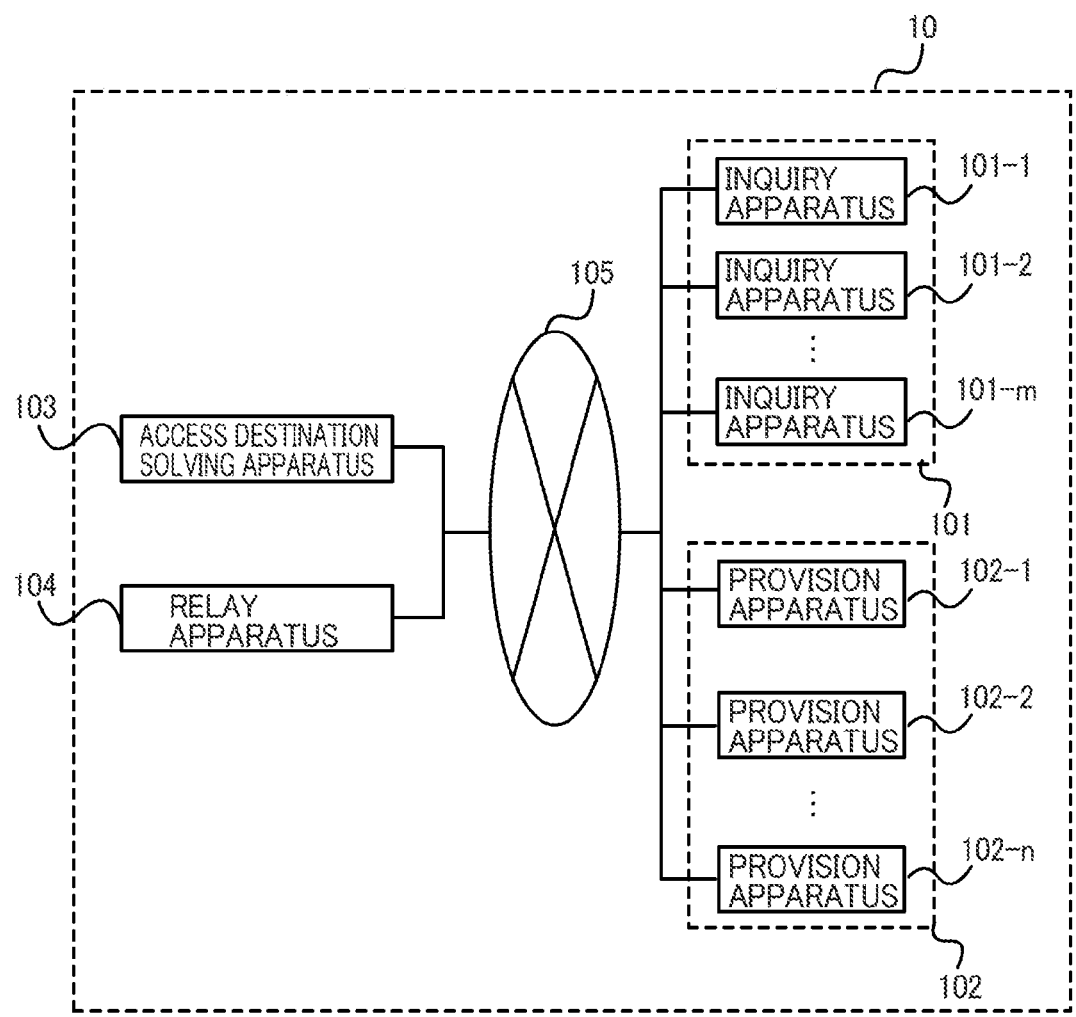
FIG. 1 is a diagram showing a network configuration example of an attribute information provision system according to a first embodiment.

Hereinafter, a first embodiment of the present invention is described in detail with reference to the accompanying drawings. FIG. 1 is a network configuration diagram constituting an attribute information provision system 10 according to the first embodiment. The attribute information provision system 10 shown in FIG. 1 is a system comprising a provision apparatus 102 provided by an information providing entity that manages attribute information of the user, an inquiry apparatus 101 provided by an information inquiry entity that provides various services to the user by utilizing attribute information held by the provision apparatus 102, an access destination solving apparatus 103 configured to manage a communication path between the inquiry apparatus 101 and the provision apparatus 102, and a relay apparatus 104 configured to convert user's identifier between the inquiry apparatus 101 and the access destination solving apparatus 103. The attribute information provision system 10 is a computer system which is capable of performing various processings related to attribute information of a user while preventing the leakage of attribute information by concealing a correspondence relationship between a user and an information providing entity that holds the attribute information of the user.

Note that in the attribute information provision system 10 according to the first embodiment, m inquiry apparatuses 101 including inquiry apparatuses 101-1 to 101-*m* as the inquiry apparatus 101 are coupled to the network 105, and n provision apparatuses 102 including provision apparatuses 102-1 to 102-*n* as the provision apparatus 102 are coupled to the network 105. As a matter of course, the numbers of those multiple apparatuses may vary according to the operation mode of the attribute information provision system 10. Incidentally, the WSC, the WSP and the DS described in the paragraph of Background Art correspond to the inquiry apparatus 101, the provision apparatus 102, and the relay apparatus 104 respectively. Concept of the DS or the coordination apparatus described in the paragraph of Background Art may include the access destination solving apparatus 103 in addition to the relay apparatus 104.

Figure 2:
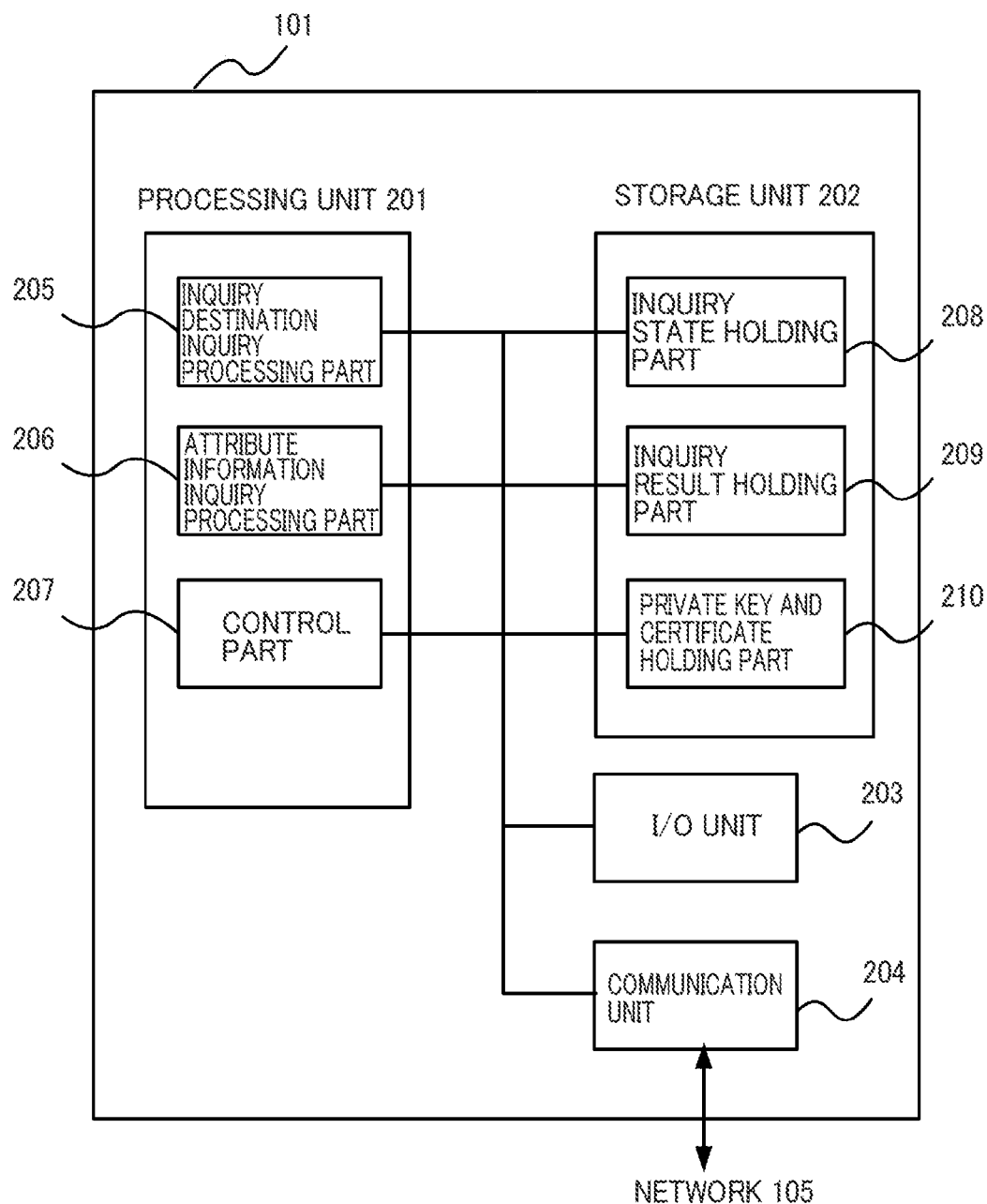
FIG. 2 is a block diagram showing a configuration example of an inquiry apparatus according to the first embodiment.

Next, configuration of apparatuses forming the attribute information provision system 10 is described. First, the inquiry apparatus 101 is described with reference to FIG. 2. FIG. 2 is a block diagram showing a configuration example of the inquiry apparatus 101 according to the first embodiment.

The inquiry apparatus 101 includes: a processing unit 201 configured to inquire the inquire destination of attribute information and to inquire attribute information in response to an input from a user of the apparatus or in response to an attribute information acquisition request from another device, such as, for example, an operation server; a storage unit 202 configured to store data, such as, for example, inquiry state and inquiry result of the attribute information, and a key necessary for processing; an I/O unit 203 configured to receive an input from the user or an administrator of the apparatus, or other devices such as the operation server; and a communication unit 204 configured to communicate with other devices such as the operation server, the provision apparatus 102, the access destination solving apparatus 103 and the relay apparatus 104 via the network 105.

Among those units, the processing unit 201 includes: an inquiry destination inquiry processing part 205 configured to inquire the inquiry destination to the relay apparatus 104; an attribute information inquiry processing part 206 configured to inquire the attribute information to the provision apparatus 102 that is obtained as a result of the inquiry, and acquire the attribute information; and a control part 207 configured to control the above units.

The storage unit 202 includes: an inquiry state holding part 208 configured to hold information such as, for example, progress of the inquiry destination inquiry processing and a temporary public key used for the inquiry processing; an inquiry result holding part 209 configured to temporarily hold the result of the attribute information inquiry processing; and a private key and certificate holding part 210 configured to hold the private key and the public key certificate used for, for example, encryption and decoding of authentication and inquiry message in the inquiry processing. The private key and the public key certificate may be alternatively kept in, for example, a tamper-resistance device in the inquiry apparatus 101.

Figure 3:
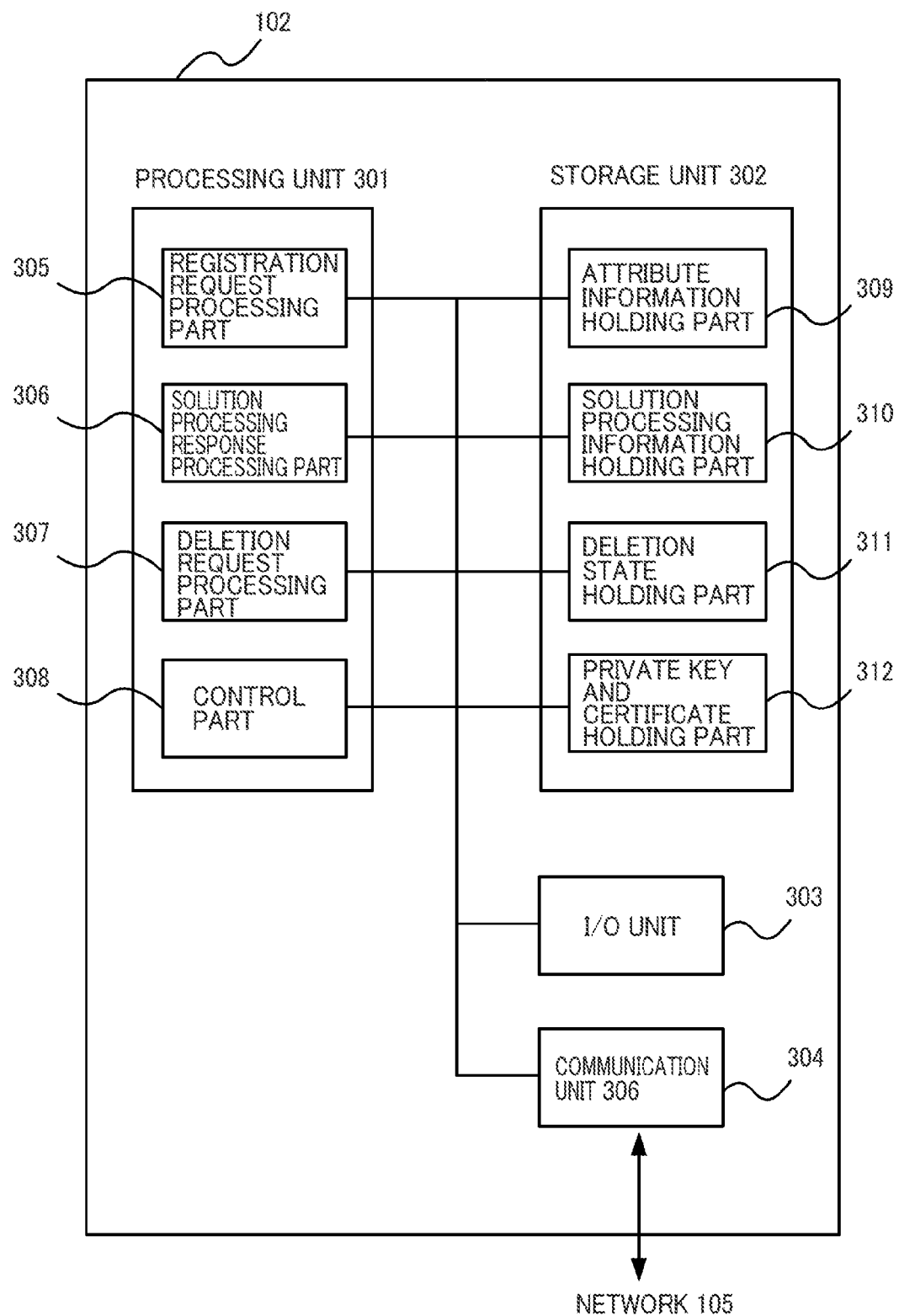
FIG. 3 is a block diagram showing a configuration example of a provision apparatus according to the first embodiment.

Next, a configuration of the provision apparatus 102 is described with reference to FIG. 3. FIG. 3 is a block diagram showing a configuration example of the provision apparatus 102 according to the first embodiment. The provision apparatus 102 includes a processing unit 301 configured to perform processings in response to a preprocessing request related to attribute information provision, a deletion processing request when ending attribute information provision from the user of the apparatus or the other device, such as, for example, an operation server, and a request from the inquiry apparatus 101; a storage unit 302 configured to store data, such as, for example, personal attribute information, processing state, and data such as a key necessary for processing; an I/O unit 303 configured to receive an input from the user or the administrator of the apparatus, or other devices such as the operation server; and a communication unit 304 configured to communicate with other devices such as the operation server, the inquiry apparatus 101, the access destination solving apparatus 103 and the relay apparatus 104.

Among those units, the processing unit 301 includes: a registration request processing part 305 configured to register the personal ID (identification information such as an identifier) of the user to whom the processing unit provides attribute information, as a pre-processing of the attribute information processing; a solution processing response processing part 306 configured to respond to a solution request of the inquiry destination provision apparatus from the inquiry apparatus 101; a deletion request processing part 307 configured to delete the personal ID, that is user ID, of the user whose attribute information is held by the processing unit from the access destination solving apparatus 103; and a control part 308 configured to control those processing units.

The storage unit 302 includes: an attribute information holding part 309 configured to store, for example, the personal attribute information held by the storage unit; a solution processing information holding part 310 configured to hold information necessary for responding to the solution request of the inquiry destination provision apparatus from the inquiry apparatus 101; a deletion state holding part 311 configured to hold the state of deletion processing; and a private key and certificate holding part 312 used for such as encrypting and decoding authentication, provision telegraph and solution processing telegraph.

Incidentally, when the inquiry apparatus 101 and the provision apparatus 102 are used by the same organization, identical private key and public key certificates may be shared to be used for the inquiry apparatus 101 and the provision apparatus 102.

Figure 4:
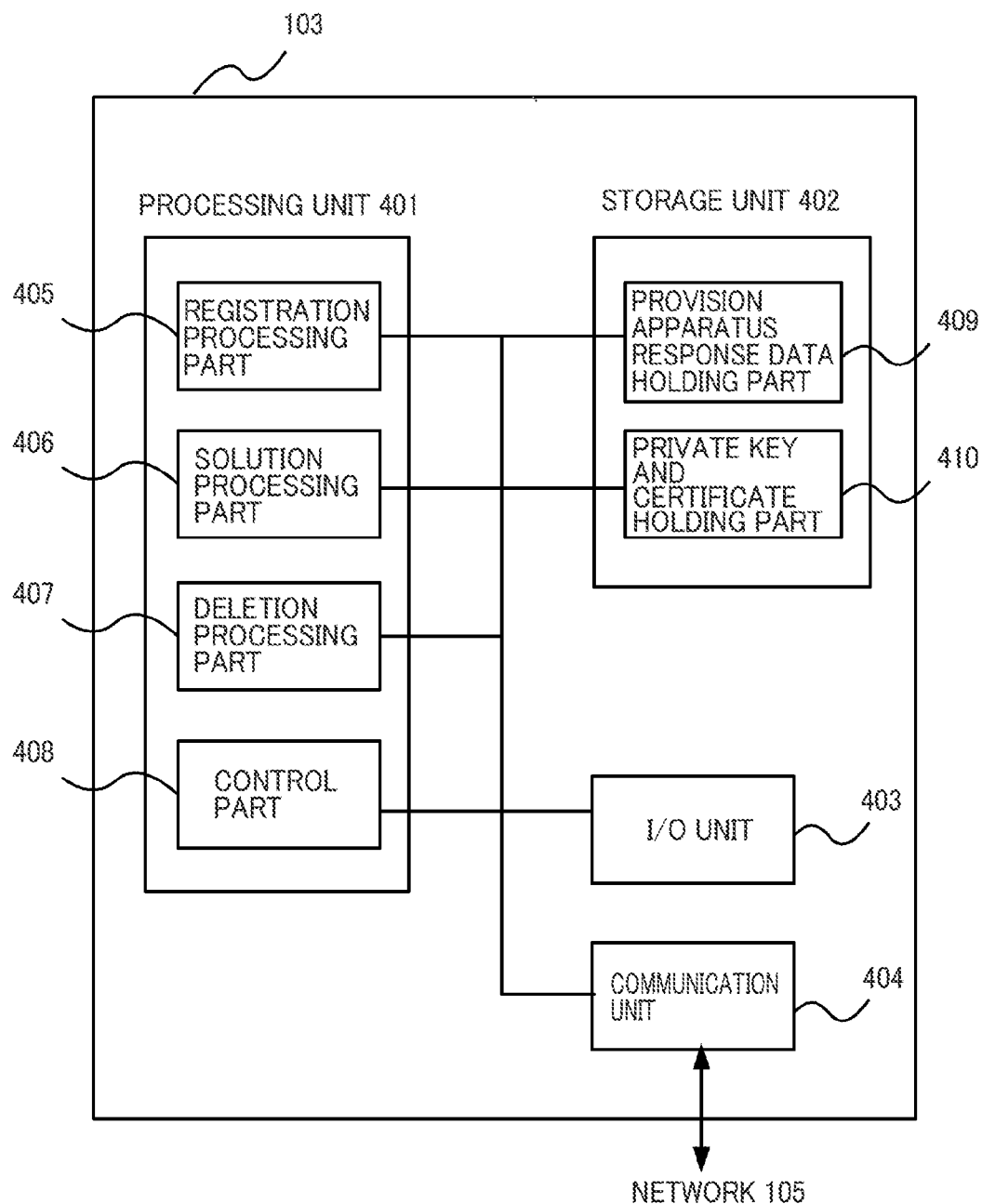
FIG. 4 is a block diagram showing a configuration example of an access destination solving apparatus according to the first embodiment.

Next, configuration of the access destination solving apparatus 103 is described with reference to FIG. 4. FIG. 4 is a block diagram showing a configuration example of the access destination solving apparatus 103 according to the first embodiment. The access destination solving apparatus 103 includes: a processing unit 401 configured to perform processings to answer a registration or deletion request from the provision apparatus 102 and a provision apparatus solution request from the inquiry apparatus 101; a storage unit 402 configured to store data used for sending the provision apparatus 102 as a response and data such as a key necessary for processing; an I/O unit 403 configured to receive an input from the user or the administrator of the apparatus, or other devices such as the operation server; and a communication unit 404 configured to communicate with other devices such as the operator server, the inquiry apparatus 101, the provision apparatus 102 and the relay apparatus 104.

Among those units, the processing unit 401 includes: a registration processing part 405 configured to perform a processing to answer a registration request from the provision apparatus 102; a solution processing part 406 configured to perform a processing to answer a provision apparatus solution request from the inquiry apparatus 101; a deletion processing part 407 configured to perform a processing to answer a deletion request from the provision apparatus 102; and a control part 408 configured to control the above units.

The recording unit 402 includes: a provision apparatus response data holding part 409 configured to register data in response to a registration request from the provision apparatus 102 and record data for responding to the provision apparatus 102, the data being referred to when requested from the inquiry apparatus 101; and a private key and certificate holding part 410 used for encrypting and decoding authentication, provision telegraph and solution processing telegraph.

Figure 5:
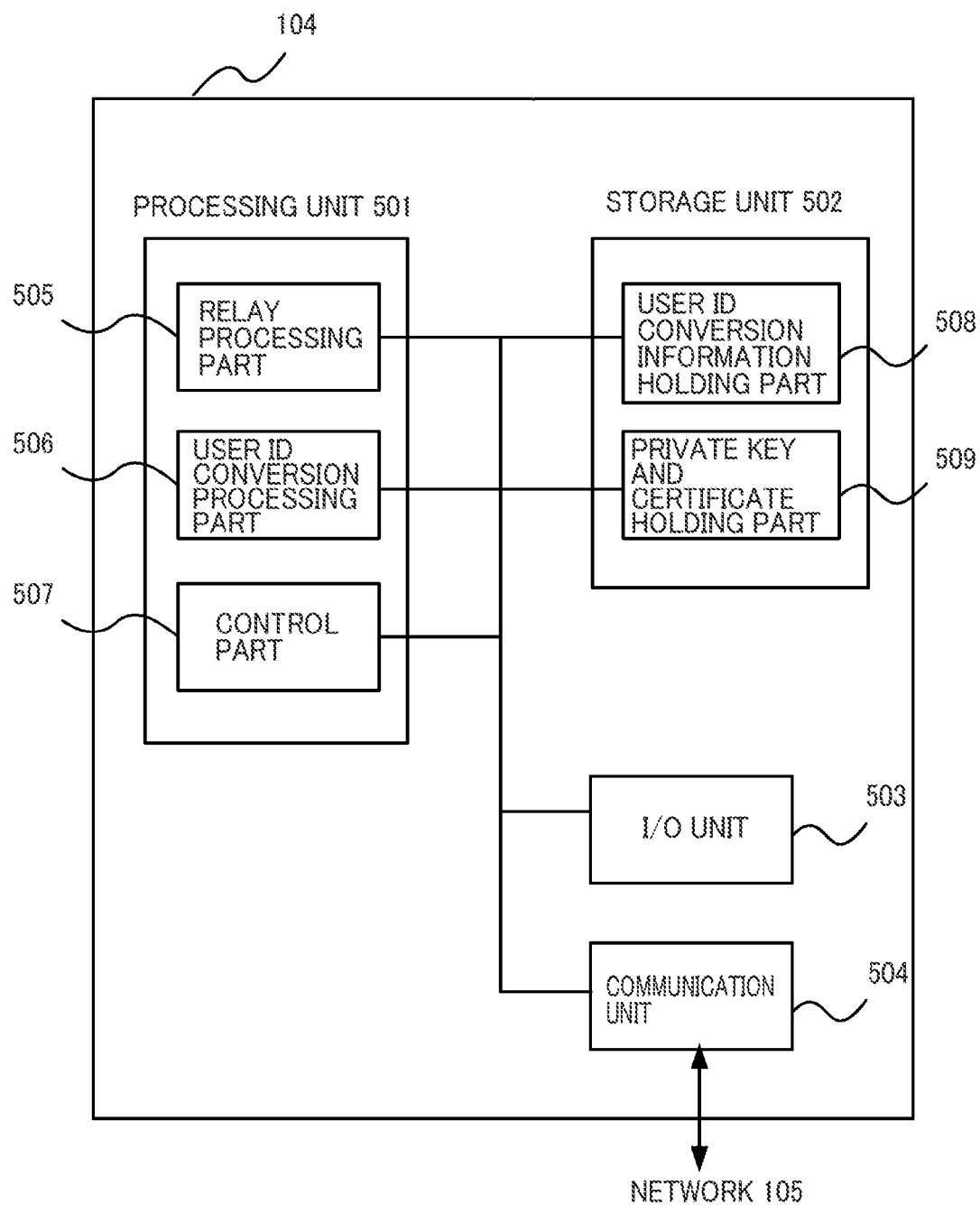
FIG. 5 is a block diagram showing a configuration example of a relay apparatus according to the first embodiment.

Next, a configuration of the relay apparatus 104 is described with reference to FIG. 5. FIG. 5 is a block diagram showing a configuration example of the relay apparatus 104 according to the first embodiment. The relay apparatus 104 includes: a processing unit 501 configured to perform processings necessary for relaying such as ID conversion when the user ID for personally identifying the user is different between the inquiry apparatus 101 and the provision apparatus 102; a storage unit 502 configured to store information necessary for ID conversion and data such as a key necessary for a processing; an I/O unit 503 configured to receive an input from the user or the administrator of the apparatus, or from other devices such as the operation server; and a communication unit 504 configured to communicate with other devices such as the operator server, the inquiry apparatus 101, the provision apparatus 102 and the relay apparatus.

Among those units, the processing unit 501 includes: a relay processing part 505 configured to perform a relay processing in response to a request from the inquiry apparatus 101; a user ID conversion processing unit 506 configured to convert different user IDs of the same user among each inquiry apparatus 101 and each provision apparatus 102 into a user ID used for each of the apparatuses; and a control part 507 configured to control the above units. For example, as a typical method for implementing the ID conversion processing unit 506, there is a method of receiving a pair of the user ID and the apparatus ID or the organization ID, and returning a user ID which corresponds to the apparatus ID.

The storage unit 502 includes: a user ID conversion information holding part 508 configured to store information necessary for converting the user ID; and a private key and certificate holding part 509 used to encrypt and decode an authentication or telegraph. As an embodiment of data holding in the user ID conversion information holding part 508, there is an example where the user ID of each inquiry apparatus 101 and each provision apparatus 102 is held for each of users.

Figure 6:
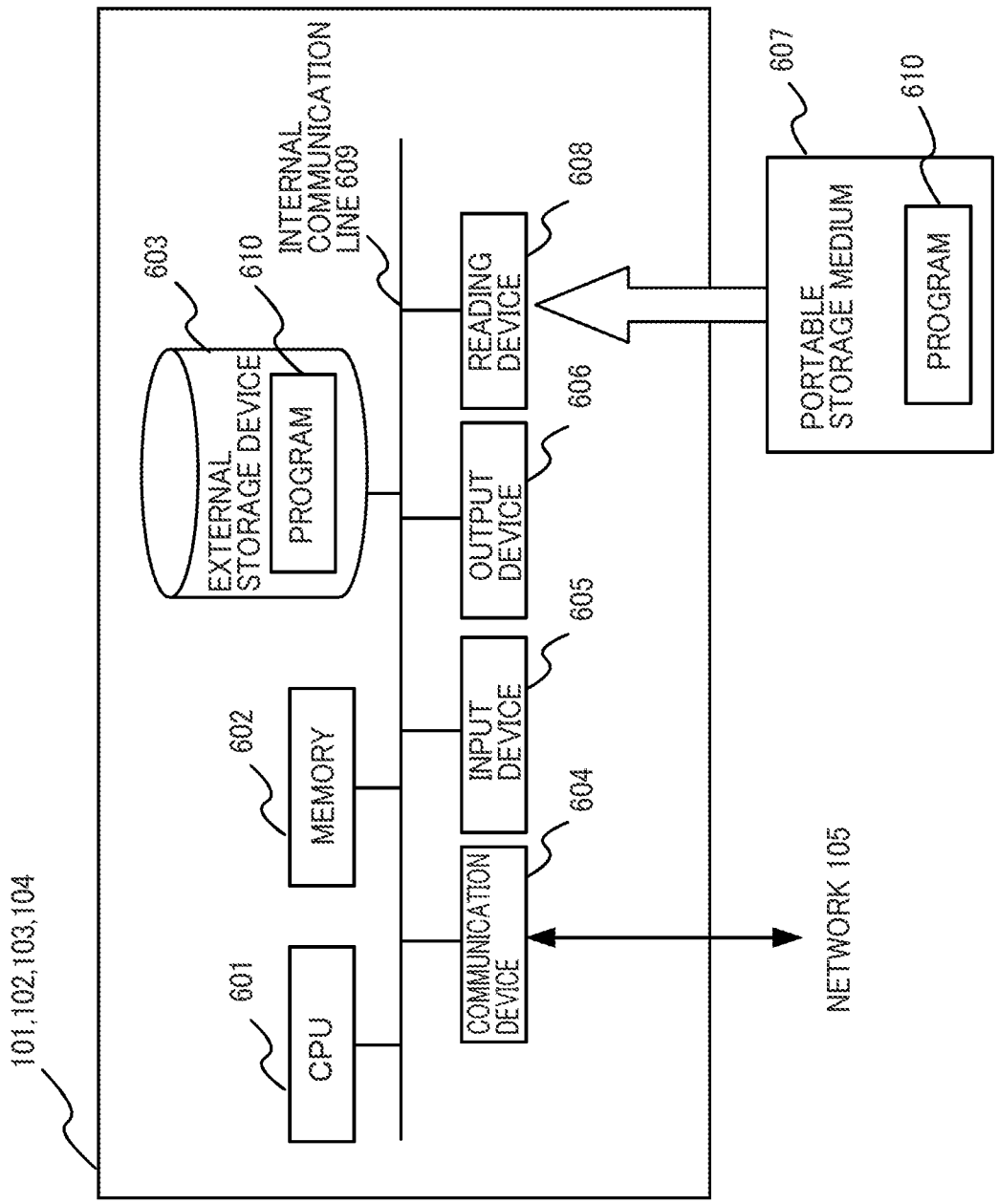
FIG. 6 is a block diagram showing a hardware configuration example of the inquiry apparatus, the provision apparatus, the access destination solving apparatus, and the relay apparatus according to the first embodiment.

The inquiry apparatus 101, provision apparatus 102, access destination solving apparatus 103 and relay apparatus 104 illustrated in FIG. 2 to FIG. 5 include a hardware configuration as illustrated in FIG. 6. The hardware configuration includes: a CPU 601 as an arithmetic device; a memory 602 comprising a volatile storage device; an external storage device 603 (storage device) such as a hard disk; a communication device 604 for communicating with other apparatuses via a network 105 such as, for example, Internet; an input device 605 such as, for example, a key board and a mouse; an output device 606 such as, for example, a display device and a printer; a reading device 608 for reading information from a portable storage medium 607, and an internal communication line 609 coupling those devices to each other. In this case, similarly to the configuration of a common electronic computer, the CPU 601 implements necessary features by executing a predetermined program 610 loaded onto the memory 602 from the external storage device 603 or the storage medium 607.

Thus, when the CPU 601 executes the program 610, processing units in the inquiry apparatus 101, provision apparatus 102, access destination solving apparatus 103 and relay apparatus 104 described above may be implemented. Communication units 204, 304, 404 and 504 are implemented when the CPU 601 uses the communication device 604. I/O units 203, 303, 403, and 503 are implemented when the CPU 601 uses the input device 605, the output device 606 or the reading device 608. Storage units 202, 302, 402 and 502 are implemented when the CPU 601 uses the memory 602 or the external storage device 603.

The program 610 may be prestored in the memory 602 of the electronic computer or in the external storage device 603, or may be provided, when necessary, from a removable storage medium 607 compatible with the electronic computer or from another device via a communication medium (such as the network 105, or a carrier or digital signal propagating thereon).

Then, a configuration example of the information used in the attribute information provision system 10 according to the first embodiment is described. FIG. 7 is a diagram showing a configuration example of a table 700 stored in the provision apparatus response data holding part 409 in the access destination solving apparatus 103 according to the first embodiment.

The provision apparatus response data holding part 409 in the access destination solving apparatus 103 is stored in the storage unit 402 and holds, in the table 700, information of a correspondent provision apparatus 102 which should be accessed to respond that a provision apparatus 102 in which personal attribute information requested by the inquiry apparatus 101 is stored. That is, the provision apparatus response data holding part 409 holds information of the user's personal user ID and a next node provision apparatus (that is, the correspondent provision apparatus) corresponding to the user ID. Further, in addition to the above two items, the provision apparatus response data holding part 409 holds information of a route identifier corresponding to an apparatus group or a communication path used to inquire the provision apparatus 102, and information of the deletion password used when deleting information of a specific user. The route identifier is an identifier used to select a next access destination when making an inquiry via multiple provision apparatuses 102. Use of the deletion password is described later with reference to FIG. 15.

Note that to improve readability of the user ID and inquiry destination provision information, "A-Sato" and "P1" are listed as examples of the user ID and the next node provision device respectively. However, randomly arranged numerals or alphanumeric characters may be assigned to the user ID as a unique ID enabling personal identification of the user. Also, for the information of the next node provision apparatus, a unique identifier for identifying the provision apparatus 102 may be provided or an address of the provision apparatus 102 in the network 105 may be listed. According to the first embodiment, the next node provision apparatus is indicated by using a symbol corresponding to the number of the provision apparatus 102 such as, for example, "P1" for the provision apparatus 102-1, "P2" for the provision apparatus 102-2, and "P3" for the provision apparatus 103-3.

FIG. 8 is a diagram showing a table example 1 of a table held by the attribute information holding part 309 in the provision apparatus 102. This table 710 stores the user ID used by each of provision apparatuses 102 for identifying the user, the route identifier corresponding to the user ID, and the deletion passwords corresponding to the user ID. The deletion password is used to prevent deletion by a provision apparatus other than registered provision apparatuses. Use of the deletion password is described later.

Figure 9:
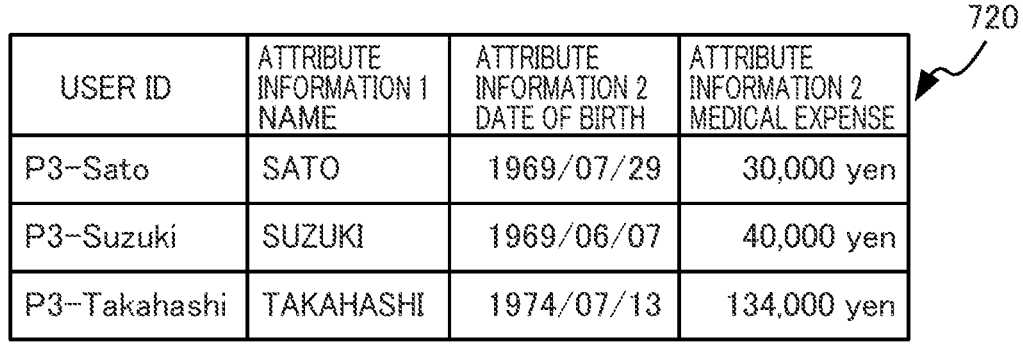
FIG. 9 is a diagram showing a configuration example of a table example 2 stored in the attribute information holding part according to the first embodiment.

FIG. 9 is a diagram showing a table example 2 held by the attribute information holding part 309 in the provision apparatus 102. This table 720 shows an example including name, date of birth and medical expense as an example of the attribute information held by associating with the user ID.

Figure 10:
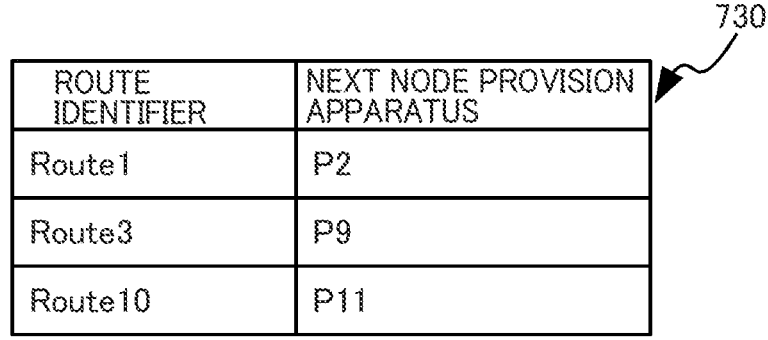
FIG. 10 is a diagram showing a configuration example of a table example 1 stored in a solution processing information holding part according to the first embodiment.
Figure 11:
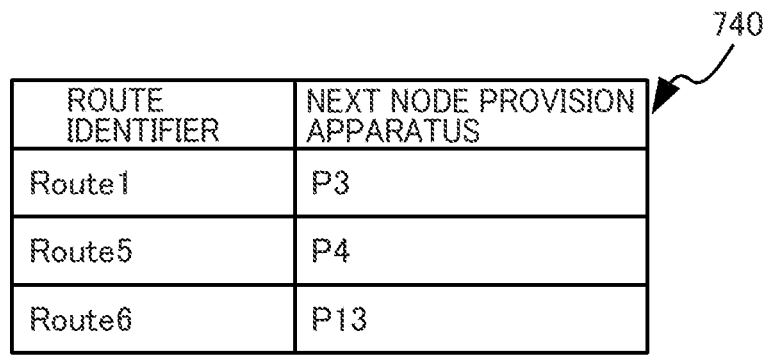
FIG. 11 is a diagram showing a configuration example of a table example 2 stored in a solution processing information holding part according to the first embodiment.
Figure 12:
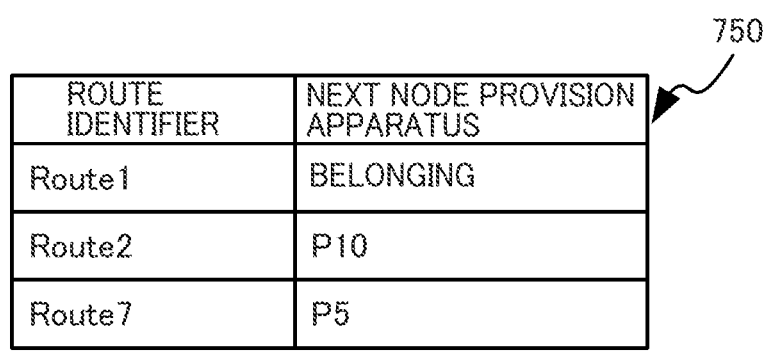
FIG. 12 is a diagram showing a configuration example of a table example 3 stored in a solution processing information holding part according to the first embodiment.

FIG. 10 is a diagram shows a table example 1 held by the solution processing information holding part 310 in the provision apparatus 102. This table 730 stores the route identifier and information of the next node provision apparatus corresponding to the route identifier. The table 730 of FIG. 10 is a table held by the provision apparatus 102-1. Likewise, the table 740 of FIG. 11 is a table example held by the provision apparatus 102-2, and the table 750 of FIG. 12 is a table example held by the provision apparatus 102-3. Data configuration is the same among FIG. 10 to FIG. 12.

Hereinafter, a practical procedure for the attribute information provision method according to the first embodiment is described with reference to the accompanying drawings. Various operations corresponding to the attribute information provision method described below are implemented by programs which are read out, for example, on a memory, and executed by the devices forming the attribute information provision system 10. The programs comprise codes for performing various operations described below.

Figure 13:
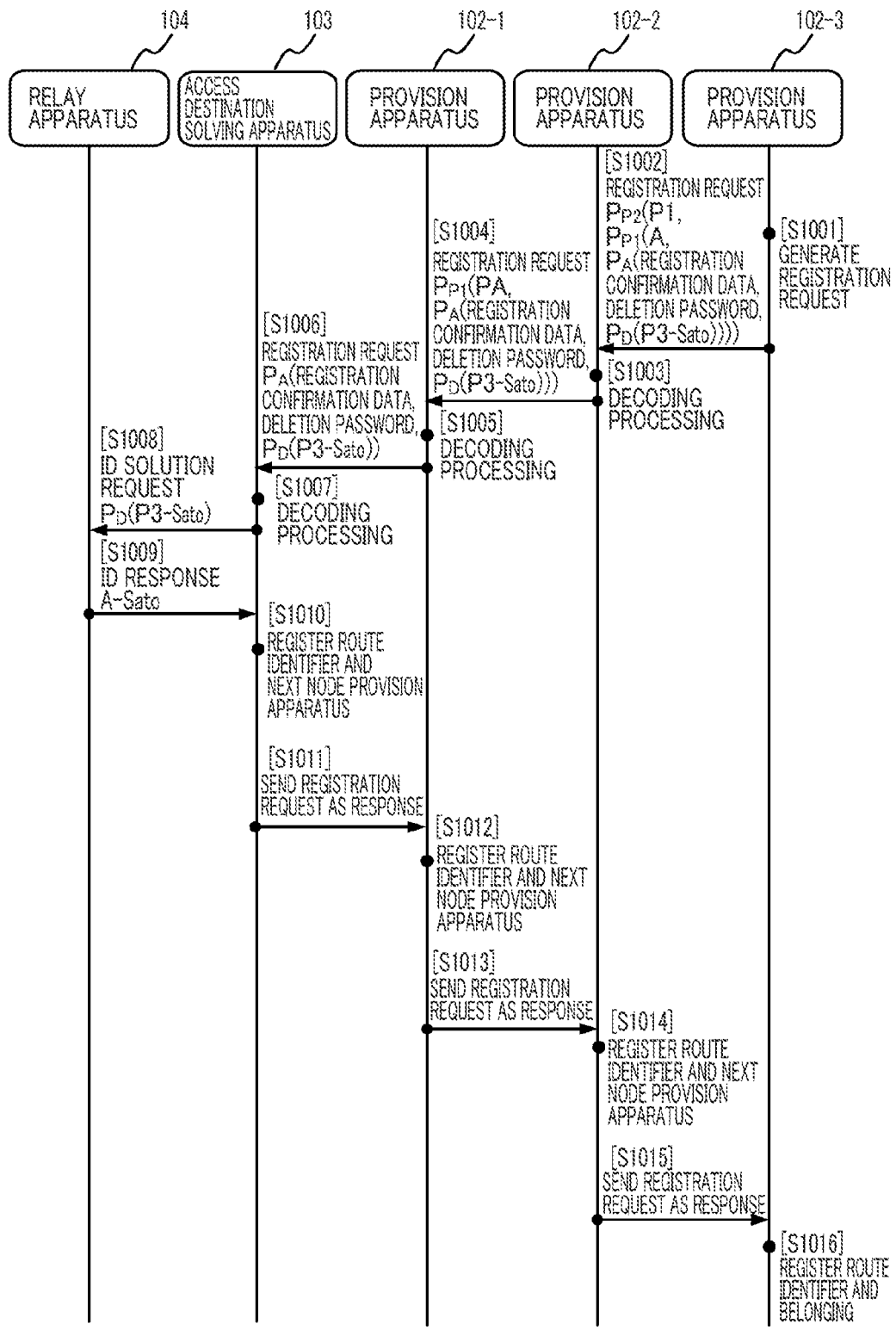
FIG. 13 is a sequence diagram showing an example 1 of an attribute information provision method according to the first embodiment.

FIG. 13 is a sequence diagram showing an example 1 of the attribute information provision method according to the first embodiment. More particularly, FIG. 13 is a diagram showing a processing example in which the provision apparatus 102 registers a user ID corresponding to attribute information held by the provision apparatus 102 into the access destination solving apparatus 103 while routing through other provision apparatuses.

Here, as an example, a processing where the provision apparatus 102-3 registers information into the access destination solving apparatus 103 via the provision apparatus 102-2 and the provision apparatus 102-1 is described. The processing of FIG. 13 is executed, for example, at the timing when registration request is performed to the provision apparatus 102, for example, from the apparatus user or the operation system via the I/O unit 303.

For example, the processing starts when the registration request processing part 305 in the provision apparatus 102-3 receives a user ID of the registration target from the I/O device 303 via the control part 308. In this case, the registration request processing part 305 in the provision apparatus 102-3 generates a registration request based on the user ID received from the I/O unit 303 (step 1001).

In this processing, the registration request processing part 305 first selects multiple certificates out of public key certificates of other provision apparatuses stored in the private key and certificate holding part 312 in a random manner. In the description below, it is assumed that the registration request processing part 305 in the provision apparatus 102-3 has selected the provision apparatus 102-2 and the provision apparatus 102-1.

Next, the registration request processing part 305 generates registration confirmation data and the deletion password. The registration confirmation data is random data for confirming whether data of the provision apparatus 102 of a registration source has been registered properly, and is generated for each registration processing. The deletion password is random data used for deleting registered information, and is generated for each registration processing. Hereinafter, assume that the registration request processing part 305 has generated "r_2Bif" as the deletion password. The registration request processing part 305 generates a registration request "$P_{P2}$(P1, $P_{P1}$(A, $P_A$(registration confirmation data, r_2Bif, $P_D$(P3-Sato))))" based on the ID of the provision apparatus indicated on the certificate selected as above, the registration confirmation data and the deletion password generated as above, and the user ID. Hereinafter, data of a string 1 encrypted with a public key of a string 2 is referred to as "P string 2 (string 1)", the access destination solving apparatus 103 is referred to as "A", and the relay apparatus 103 is referred to as "D".

Next, the provision apparatus 102-3 sends the registration request generated in the above processing to the provision apparatus 102-2 which is a provision apparatus randomly selected in the step 1001 (step 1002).

Meanwhile, upon receiving the registration request via the communication unit 304 and the control part 308, the registration request processing part 305 of the provision apparatus 102-2 executes a processing of decoding the registration request by using a private key thereof stored in the private key and certificate holding part 312 (step 1003), and obtains the decoding result of "P1, $P_{P1}$(A, $P_A$(registration confirmation data, r_2Bif, $P_D$(P3-Sato)))".

The registration request processing part 305 of the provision apparatus 102-2 identifies, based on the decoding result, "P1" as a next party to communicate and "$P_{P1}$(A, $P_A$(registration confirmation data, r_2Bif, $P_D$(P3-Sato)))" as the registration request, and sends the registration request to "P1" or the provision apparatus 102-1 (step 1004).

Next, upon receiving the registration request, the provision apparatus 102-1 decodes the received registration request with the private key thereof in the same manner as the provision apparatus 102-2 (step 1005), and obtains "A,$P_A$(registration confirmation data, r_2Bif, $P_D$(P3-Sato))" as the decoding result thereof. The provision apparatus 102-1 identifies, based on the decoding result, "A" or access destination solving apparatus 103 as a next party to communicate and "$P_A$(registration confirmation data, $P_D$(P3-Sato))" as the registration request, and sends the registration request to the access destination solving apparatus 103 (step 1006).

On the other hand, the registration processing part 405 of the access destination solving apparatus 103 receives the registration request transmitted from the provision apparatus 102-1 via the communication unit 404 and the control part 408, decodes the registration request with a private key thereof stored in the private key and certificate holding part 410 (step 1007), and obtains the decoding result of "registration confirmation data, r_2Bif, $P_D$(P3-Sato)". The access destination solving apparatus 103 sends "$P_D$(P3-Sato)" which is a registration target user ID acquired from the registration result to the relay apparatus 104 as an ID solution request (step 1008).

The user ID conversion processing unit 506 of the relay apparatus 104 receives the ID solution request via the communication unit 504 and the control part 507, decodes "$P_D$(P3-Sato)" with a private key thereof stored in the private key and certificate holding part 509, and obtains "P3-Sato". Based on information stored in the user ID conversion information holding part 508, the relay apparatus 104 converts "P3-Sato" into "A-Sato" which is a user ID used in the access destination solving apparatus 103, and returns the "A-Sato" as a response to the ID solution request to the access destination solving apparatus 103 (step 1009).

Upon receiving the ID solution request, the registration processing part 405 of the access destination solving apparatus 103 generates "Route1" as the route identifier, and registers the user ID "A-Sato", the route identifier "Route1", the deletion password "r_2Bif", and the next node provision apparatus "P1" into the provision apparatus response data holding part 409 by associating with each other (step 1010). Following the registration, the access destination solving apparatus 103 sends the route identifier "Route1" and the registration confirmation data to the provision apparatus 102-1 being a correspondent provision apparatus as a response to the registration request of the step 1006 (step 1011).

Next, upon receiving the response from the access destination solving apparatus 103, the registration request processing part 305 of the provision apparatus 102-1 registers the route identifier "Route1" and the next node provision apparatus "P2" into the solution processing information holding part 306 (step 1012). Following the registration, the access destination solving apparatus 103 sends the route identifier and the registration confirmation data to the provision apparatus 102-2 as a response to the registration request of the step 1004 (step 1013).

Upon receiving the response from the provision apparatus 102-1, the provision apparatus 102-2 registers, in the same manner as the step 1012 and the step 1013, the route identifier "Route1" and the next node provision apparatus "P3" into the solution processing information holding part 306 (step 1014). Following the registration, the provision apparatus 102-2 sends the route identifier and registration confirmation data to the provision apparatus 102-3 as a response to the registration request of the step 1002 (step 1015).

Upon receiving the response from the provision apparatus 102-2, the registration request processing part 305 of the provision apparatus 102-3 determines whether registration confirmation data indicated in the response is identical with data generated by the registration request processing part 305, and if determined as identical, registers the route identifier "Route1" and the next node provision apparatus "belonging" into the solution processing information holding part 306, and the route identifier "Route1" and the deletion password "r_2Bif" into the attribute information holding part 309. In this case, the provision apparatus 102-3 is registered as "belonging"; however, it may be other information as far as it indicates that the inquiry request which should be responded by the provision apparatus 102-3.

Figure 14:
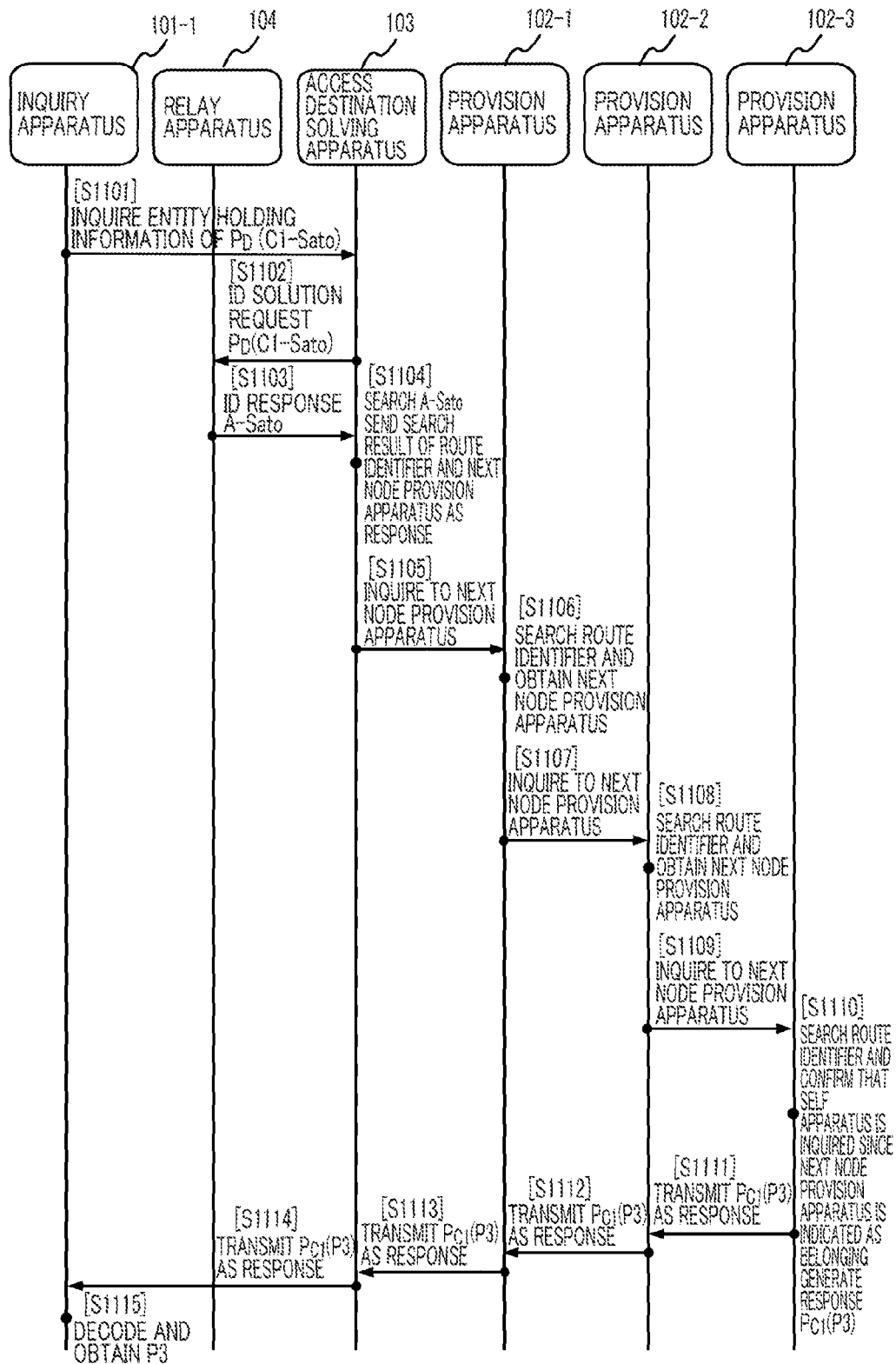
FIG. 14 is a sequence diagram showing an example 2 of an attribute information provision method according to the first embodiment.

Then, an example of a processing where: the inquiry apparatus 101 inquires the access destination provision apparatus 102 to the access destination solving apparatus 103; and the access destination solving apparatus 103 and the provision apparatus 102 respond to the inquiry by using information stored in the provision apparatus response data holding part 409 and information stored in the solution processing information holding part 310 is described. FIG. 14 is a sequence diagram showing an example 2 of the attribute information provision method according to the first embodiment.

This sequence is executed by the inquiry apparatus 101, for example, at the timing when an inquiry request of a user is made, for example, from the apparatus user or the operation system via the I/O unit 203. That is, the inquiry destination inquiry processing part 205 of the inquiry apparatus 101 starts the processing upon receiving a user ID of the inquiry target from the I/O device 203 via the control part 207.

In this case, the inquiry apparatus 101 first generates the access destination solution request based on the user ID acquired from the I/O unit 203 and transmits the access destination solution request to the access destination solving apparatus 104 (step 1101). Specifically, the inquiry apparatus 101 generates information "$P_D$(C1-Sato)" which is a user ID "C1-Sato" encrypted with a public key of the relay apparatus 104, and transmits the information to the access destination solving apparatus 104.

Meanwhile, upon receiving the access destination solution request, an access destination solving function 103 of the access destination solving apparatus 103 notifies the relay apparatus 104 (step 1102) of an ID solution request including the value of the "$P_D$(C1-Sato)" to. Meanwhile, upon receiving the ID solution request, the user ID conversion processing unit 506 of the relay apparatus 104 decodes the ID solution request by using a private key thereof stored in the private key and certificate holding part 509, and sends the decoding result as a response to the access destination solving apparatus 103 (step 1103). Specifically, the user ID conversion information holding unit 506 decodes "$P_D$(C1-Sato)" indicated by the ID solution request with a private key into "C1-Sato", and further converts "C1-Sato" into "A-Sato" by using information stored in the user ID conversion information holding unit 508 and sends the converted user ID as a response to the access apparatus solution device 104.

Upon obtaining the converted user ID from the relay apparatus 104, the access destination solving apparatus 103 executes search in the table 700 (see FIG. 7) held in the provision apparatus response data holding part 409 with the converted user ID, and obtains each values of the route identifier and the next node provision apparatus corresponding to the user ID (step 1104). Specifically, in the table 700 of FIG. 7, the access destination solving apparatus 103 searches with "A-Sato" as a key and obtains values, the route identifier "Route1" and the next node provision apparatus "P1".

Next, the access destination solving apparatus 103 transmits an access destination solution request including the route identifier identified in the step 1104 to the provision apparatus of the correspondent or the next node provision apparatus identified by acquiring the value in the step 1104 (step 1105). Specifically, the access destination solving apparatus 103 transmits an access destination solution request including the route identifier "Route1" to the provision apparatus 102-1 being "P1".

On the other hand, the solution processing response processing part 306 of the provision apparatus 102-1 receives the access destination solution request including the route identifier via the communication unit 304 and the control part 308, searches the route identifier from the table 730 (FIG. 10) stored in the solution processing information holding part 310, and obtains the next node provision apparatus (step 1106). Specifically, the solution processing response processing part 306 searches in the table 730 of FIG. 10 with "Route1" and obtains "P2" as an inquiry destination provision apparatus.

Then, the provision apparatus 102-1 transmits an access destination solution request including the route identifier obtained from the access destination solving apparatus 103 to the next node provision apparatus identified by acquiring the value in the step 1106 (step 1107). Specifically, the provision apparatus 102-1 transmits the route identifier "Route1" to the provision apparatus 102-2 being "P2".

Upon receiving the access destination solution request from the provision apparatus 102-1, the provision apparatus 102-2 searches the next node provision apparatus from the table 740 based on the route identifier in the same manner as the provision apparatus 102-1 (step 1108), and transmits an access destination solution request including the route identifier obtained from the provision apparatus 102-1 to the next node provision apparatus identified by acquiring the value (step 1109). Specifically, the provision apparatus 102-2 searches in the table 740 of FIG. 11 with "Route1" and acquires "P3", and transmits the route identifier "Route1" to the provision apparatus 102-3 corresponding to "P3".

Upon receiving the access destination solution request from the provision apparatus 102-2, the provision apparatus 102-3 searches the next node provision apparatus from the route identifier in the same manner as the provision apparatuses 102-1 and 102-2 and obtains "belonging" as the search result. Thus, the provision apparatus 102-3 may confirm that the provision apparatus 102-3 itself is the access destination or the attribute information provision introduction destination. Thus, the provision apparatus 102-3 generates a response message (step 1110). Specifically, the provision apparatus 102-3 searches in the table 750 of FIG. 12 with "Route1" and obtains "belonging", and generates "$P_{C1}(P3)$" which is an encrypted identifier thereof indicated with a public key of the inquiry apparatus 101-1.

Next, the provision apparatus 102-3 transmits the generated response message as a response of the step 1109 (step 1111). Specifically, the provision apparatus 102-3 transmits "$P_{C1}(P3)$" to the provision apparatus 102-2.

Then, upon receiving the response message from the provision apparatus 102-3, the provision apparatus 102-2 transmits the response message to the provision apparatus 102-1 as a response of the step 1107 (1112). Specifically, the provision apparatus 102-2 transmits "$P_{C1}(P3)$" to the provision apparatus 102-1. Similarly, the provision apparatus 102-1 transmits the response message received from the provision apparatus 102-2 to the access destination solving apparatus 103 as a response of the step 1105 (step 1113). Similarly, the access destination solving apparatus 103 transmits the received response message to the inquiry apparatus 101-1 as a response of the step 1101 (step 1114).

Next, the inquiry apparatus 101-1 performs decoding processing of the response message received from the access destination solving apparatus with a private key thereof held in the private key and certificate holding part 210 and obtains information of an access destination provision apparatus related to the attribute information of the user. Specifically, the inquiry apparatus 101-1 decodes "$P_{C1}(P3)$" and obtains "P3".

Figure 15:
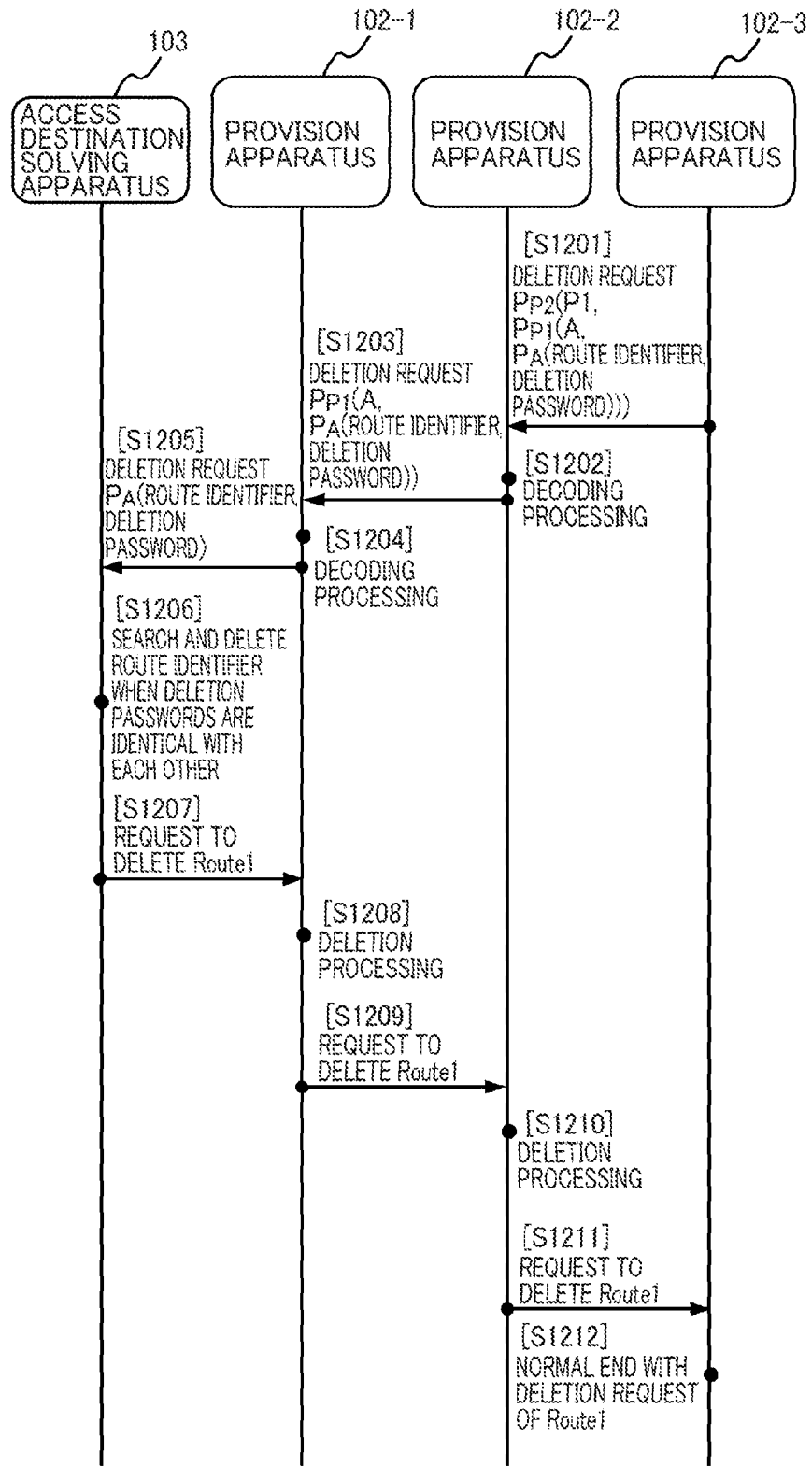
FIG. 15 is a sequence diagram showing an example 3 of an attribute information provision method according to the first embodiment.

Next, an example of a processing where data registered by a provision apparatus and stored in the provision apparatus response data holding part 409 is deleted is described with reference to the provision apparatus 102. FIG. 15 is a sequence diagram showing an example 3 of the attribute information provision method according to the first embodiment.

This sequence is executed, for example, at the timing when a deletion request of information of a user is made, for example, from the apparatus user or the operation system via the I/O unit 303 of the provision apparatus 102. That is, the deletion request processing part 307 starts the processing upon receiving a user ID of the deletion target from the I/O device 303 via the control part 308.

In this case, for example, the deletion request processing part 307 of the provision apparatus 102-3 searches in the table 710 (see FIG. 8) stored in the attribute information holding part 309 with the user ID acquired from the I/O unit 303, acquires the corresponding route identifier and deletion password, further selects any other provision apparatus from the certificate stored in the private key and certificate holding part 312 and generates the deletion request (step 1201). Specifically, the deletion request processing part 307 performs search in the table 710 with the user ID "P3-Sato" as a key, and obtains the route identifier "Route1" and the deletion password "r_2Bif". Then, the deletion request processing part 307 generates "$P_{P2}(P1, P_{P1}(A, P_A(Route1, r\_2Bif)))$" as a deletion request.

Next, upon receiving the deletion request, the provision apparatus 102-2 decodes the deletion request by using a private key thereof stored in the private key and certificate holding part 312 (step 1202) and acquires a next sending destination, and transmits the deletion request to the next sending destination (step 1203). Specifically, the provision apparatus 102-2 obtains "P1" as a next sending destination by decoding "$P_{P2}(P1, P_{P1}(A, P_A(Route1, r\_2Bif)))$", and obtains "$P_{P1}(A, P_A(Route1, r\_2Bif))$" as the deletion request, and sends this to the provision apparatus 102-1.

Upon receiving the deletion request from the provision apparatus 102-2, the provision apparatus 102-1 decodes the deletion request in the same manner as the provision apparatus 102-2 (step 1204) and then sends the deletion request to the next sending destination (step 1205). Specifically, the provision apparatus 102-1 obtains "A" as a next sending destination by decoding "$P_{P1}(A, P_A(Route1, r\_2Bif))$", and obtains "$P_A(Route1, r\_2Bif)$" as a deletion request, and sends this to the access destination solving apparatus 103.

Next, upon receiving the deletion request from the provision apparatus 102-1, the access destination solving apparatus 103 decodes the deletion request in the same manner as the provision apparatuses 102-2 and 102-1, acquires the route identifier and the deletion password, acquires the deletion password by searching in the table 700 (see FIG. 7) stored in the provision apparatus response data holding part 409 with the route identifier, and when the acquired deletion password is identical with a deletion password included in the deletion request, acquires the route identifier and the next node provision apparatus and then deletes information on the route identifier from the table 700 (step 1206). Specifically, the access destination solving apparatus 103 obtains "Route1, r_2Bif" by decoding "$P_A$(Route1, r_2Bif)", acquires "r_2Bif" as a deletion password as a result of the search in the table 700 with "Route1" as a key, and since the deletion passwords are identical with each other, deletes a row of the route identifier "Route1" from the table 700.

Next, the access destination solving apparatus 103 transmits a deletion request including the route identifier to the next node provision apparatus identified by acquiring the value in the step 1204 (step 1207). Specifically, the access destination solving apparatus 103 transmits the deletion request including "Route1" to the provision apparatus 102-1.

On the other hand, the provision apparatus 102-1 searches the route identifier included in the deletion request which is received from the access destination solving apparatus 103 in the table 730 (see FIG. 10) stored in the solution processing information holding part 310, and after having acquired the value of the corresponding next node provision apparatus, deletes a row in the table 730 where the route identifier is included (step 1208). Thereafter, the provision apparatus 102-1 transmits a deletion request including the route identifier to the next node provision apparatus (step 1209). Specifically, the provision apparatus 102-1 searches in the table 730 (see FIG. 10) with "Route1" as a key and obtains "P2". Thereafter, the provision apparatus 102-1 deletes "Route1" and "P2" from the table 730 and transmits the deletion request including "Route1" to the provision apparatus 102-2.

On the other hand, upon receiving the deletion request from the provision apparatus 102-1, the provision apparatus 102-2 searches in a table 740 (see FIG. 11) with the route identifier as a key in the same manner as the provision apparatus 102-1 and obtains the value of the next node provision apparatus being the search result. Then, the provision apparatus 102-2 deletes a row corresponding to the route identifier from the table 740 (step 1210). Then, the provision apparatus 102-2 transmits a deletion request including the route identifier to the next node provision apparatus (step 1211). Specifically, the provision apparatus 102-2 searches "Route1" in the table 740 (see FIG. 11) and obtains "P3". Then, the provision apparatus 102-2 deletes "Route1" and "P2" from the table 740 and transmits the deletion request including "Route1" to the provision apparatus 102-3.

Next, the provision apparatus 102-3 determines that the route identifier included in the deletion request received from the provision apparatus 102-2 is the route identifier which the provision apparatus 102-3 has requested to delete, and ends the processing (step 1212). The first embodiment of the present invention is described as above. According to the first embodiment, the access destination solving apparatus 103 of the attribute information provision system 10 is capable of sending the provision apparatus 102 being an attribute information introduction destination in response to a request of the inquiry apparatus 101 even when not holding a table of the correspondence relationship between the user and the provision apparatus 102.

Further, when registering or deleting a provision apparatus, a provision apparatus 102 as a registration source or a deletion source is concealed from the access destination solving apparatus 103 by sending data via a provision apparatus other than a provision apparatus sending a registration request or a deletion request. A provision apparatus 102 with which the access destination solving apparatus 103 communicates for an inquiry is a randomly selected provision apparatus different from a provision apparatus configured to hold information of the inquiry target person. Thus, the relation between the user and the provision apparatus is concealed from the access destination solving apparatus 103.

Thus, even when the administrator of the access destination solving apparatus 103 acts wrong of leaking various tables or making reference to a registration record, an inquiry record or a deletion record, the leakage of personal information may be prevented. Also, with the deletion password shared between the provision apparatus as a registration source and the access destination solving apparatus 103 when registering and with the deletion password included in the deletion request when deleting, deletion by a provision apparatus other than the provision apparatus as a registration source may be prevented.

Although in the first embodiment, an example of processing registration, inquiry and deletion of information via two provision apparatuses 102-1 and 102-2 as a communication path is described, the number of apparatuses in the apparatus group forming the communication path or the number of provision apparatuses routing information may be selected as desired. Also, the number of routing provision apparatuses may be changed for each processing.

Although a response which the provision apparatus 102 sends to an inquiry is encrypted with a public key of the inquiry apparatus 101, the public key used in this processing may be a temporary public key which the inquiry apparatus 101 creates for each inquiry processing. Thus, identification of the inquiry apparatus 101 may be prevented. Although in the first embodiment, the inquiry apparatus 101 and the provision apparatus 102 are separate apparatuses, two features may be implemented within the same apparatus.

Then, the second embodiment of the present invention is described. A difference from the first embodiment is that data held in the provision apparatus response data holding part 409 of the access destination solving apparatus 103 illustrated in the table 700 of FIG. 7 is not a combination of the route identifier and the next node provision apparatus, but the route information is held. The route information is information which is encrypted information of a routing provision apparatus 102 with a public key of each of provision apparatuses 102, when an inquiry is performed by routing via multiple provision apparatuses. For example, in case of a route or communication path formed by provision apparatuses 102 "P1", "P2" and "P3", the route information is "P1, $P_{P1}$(P2, $P_{P2}$(P3, $P_{P3}$(belonging)))". Information of the route identifier and the next node provision apparatus in the solution processing information holding part 310 of the provision apparatus 102 illustrated in tables 730 to 750 of FIGS. 10 to 12 is not held.

Figure 16:
FIG. 16 is a diagram showing a configuration example of a table stored in a provision apparatus response data holding part according to a second embodiment of the present invention.

FIG. 16 is a diagram showing a configuration example of a table 760 stored in the provision apparatus response data holding part 409 of the access destination solving apparatus 103. According to the second embodiment, the provision apparatus response data holding part 409 of the access destination solving apparatus 103 holds the user ID, the route information corresponding to the user ID and the deletion password in the table 760.

Figure 17:
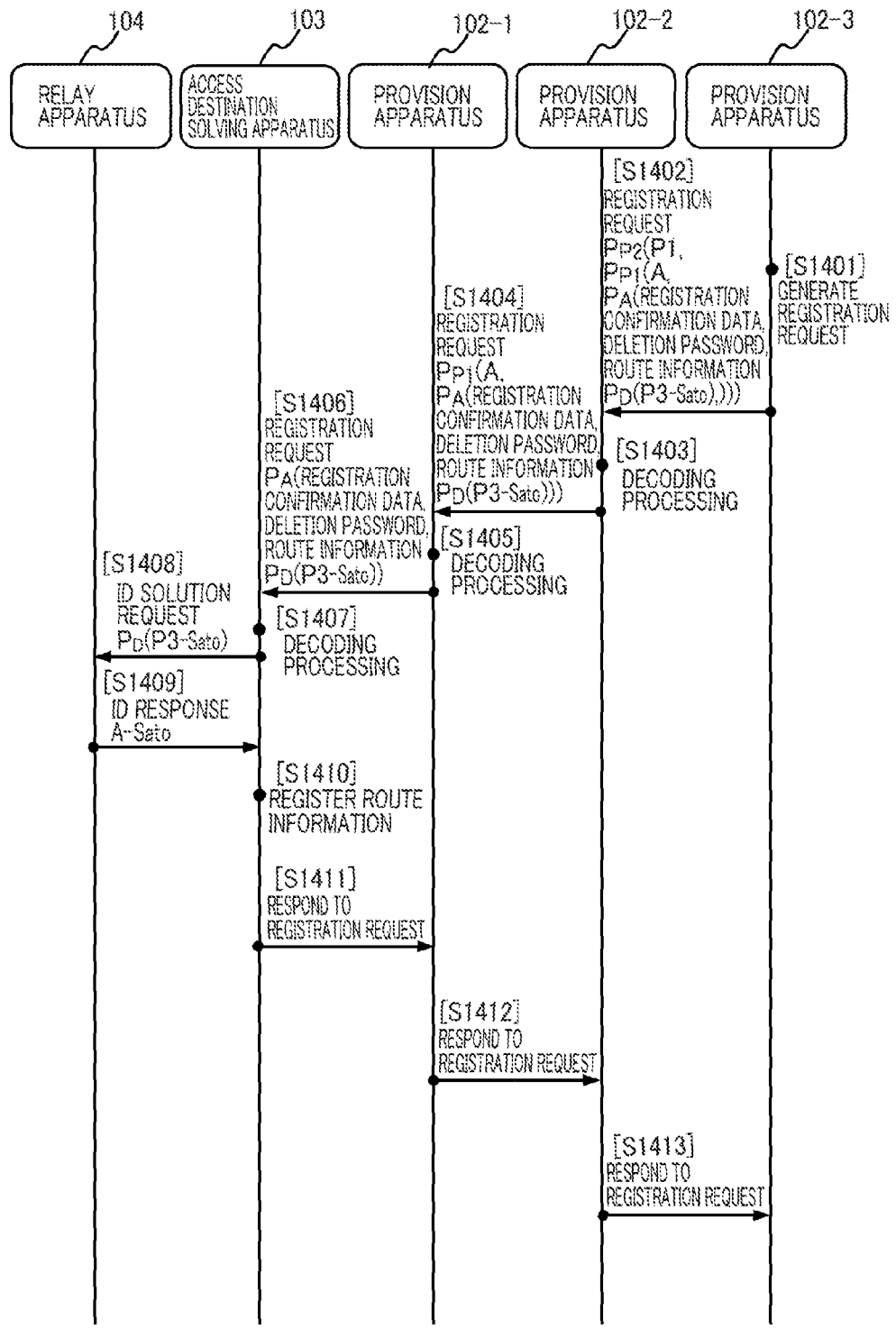
FIG. 17 is a sequence diagram showing an example 1 of an attribute information provision method according to the second embodiment.

FIG. 17 is a sequence diagram showing an example 1 of the attribute information provision method according to the second embodiment. More particularly, FIG. 17 is a diagram showing a processing example in which the provision apparatus 102 registers a user ID corresponding to the attribute information held thereby into the access destination solving apparatus 103 while routing through other provision apparatuses. Here, as an example, a processing where the provision apparatus 102-3 registers information into the access destination solving apparatus 103 via the provision apparatus 102-2 and the provision apparatus 102-1 is described. The processing of FIG. 17 is executed, for example, at the timing when registration is requested to the provision apparatus 102, for example, from the apparatus user or the operation system via the I/O unit 303.

That is, the registration request processing part 305 starts the processing upon receiving a user ID of the registration target from the I/O device 303 via the control part 308. First, the registration request processing part 305 generates a registration request based on the user ID received from the I/O unit 303 (step 1401).

Specifically, the registration request processing part 305 selects multiple certificates out of public key certificates of other provision apparatuses stored in the private key and certificate holding part 312 in a random manner. In the description below, it is assumed that the registration request processing part 305 has selected the provision apparatus 102-2 and the provision apparatus 102-1. Next, the registration request processing part 305 generates the registration confirmation data, the deletion password, and the route information. The registration confirmation data and the deletion password are the same as described with reference to FIG. 13. On the other hand, the route information is generated based on the randomly selected certificates described above and is a combination of information of a provision apparatus serving as a correspondent in the provision apparatus 102-3, and information of next and subsequent responding parties encrypted with a public key of a provision apparatus serving as a next correspondent. For example, when provision apparatuses selected by the provision apparatus 102-3 are "P1", "P2", and "P3", the route information is "P1, $P_{P1}$(P2, $P_{P2}$(P3, $P_{P3}$(belonging)))". Hereinafter, assume that "r_2Bif" has been generated as the deletion password.

The registration request processing part 305 of the provision apparatus 102-3 generates a registration request "$P_{P2}$ (P1, $P_{P1}$(A, $P_A$(registration confirmation data, r_2Bif, route information, $P_D$(P3-Sato))))" based on the ID of the provision apparatus indicated on the selected certificate, the generated registration confirmation data, the deletion password, the route information and the user ID. Next, the provision apparatus 102-3 sends the generated registration request to the provision apparatus 102-2 which is a provision apparatus randomly selected in the step 1401 (step 1402).

Upon receiving the registration request via the communication unit 304 and the control part 308, the registration request processing part 305 of the provision apparatus 102-2 decodes the registration request by using the private key thereof stored in the private key and certificate holding part 312 (step 1403), and obtains the decoding result of "P1, $P_{P1}$(A, $P_A$(registration confirmation data, r_2Bif, route information, $P_D$(P3-Sato)))". The registration request processing part 305 of the provision apparatus 102-2 identifies, based on the decoding result, "P1" as a next apparatus to communicate or as a correspondent provision apparatus, and $P_{P1}$(A, $P_A$(registration confirmation data, r_2Bif, route information, $P_D$(P3-Sato)))" as the registration request, and sends the registration request to the provision apparatus 102-1 (step 1404).

The provision apparatus 102-1 decodes the received registration request with the private key thereof in the same manner as the provision apparatus 102-2 (step 1405), and obtains "A, $P_A$(registration confirmation data, r_2Bif, route information, $P_D$(P3-Sato))" as the decoding result thereof. The registration request processing part 305 of the provision apparatus 102-1 identifies, based on the decoding result, "A" as a next apparatus to communicate or as a correspondent provision apparatus, and "$P_A$(registration confirmation data, r_2Bif, route information, $P_D$(P3-Sato))" as the registration request, and sends the registration request to the access destination solving apparatus 103 (step 1406).

Next, upon receiving the registration request via the communication unit 404 and the control part 408, the registration request processing part 405 of the access destination solving apparatus 103 decodes the registration request by using the private key thereof stored in the private key and certificate holding part 410 (step 1407), and obtains the decoding result of "registration confirmation data, $P_D$(P3-Sato)". The registration processing part 405 of the access destination solving apparatus 103 sends "$P_D$(P3-Sato)" which is a registration target user ID acquired from the registration result to the relay apparatus 104 as an ID solution request (step 1408).

Next, the user ID conversion processing unit 506 of the relay apparatus 104 receives the ID solution request via the communication unit 504 and the control part 507, decodes "$P_D$(P3-Sato)" with a private key thereof stored in the private key and certificate holding part 509, and obtains "P3-Sato". Then, based on information stored in the user ID conversion information holding part 508, the user ID conversion processing unit 506 converts "P3-Sato" into "A-Sato" which is a user ID used in the access destination solving apparatus 103, and sends "A-Sato" as a response to the ID solution request to the access destination solving apparatus 103 (step 1409).

Upon receiving the response to the ID solution request from the relay apparatus 104, the registration processing part 405 of the access destination solving apparatus 103 registers the user ID "A-Sato", the route information "P1, $P_{P1}$(P2, $P_{P2}$(P3, $P_{P3}$(belonging))))" and the deletion password "r_2Bif" into the provision apparatus response data holding part 409 (step 1410). Following the registration, the registration processing part 405 sends the registration confirmation data to the provision apparatus 102-1 as a response to the registration request of the step 1406 (step 1411).

Next, upon receiving this response, the registration request processing part 305 of the provision apparatus 102-1 sends the registration confirmation data to the provision apparatus 102-2 as a response to the registration request of the step 1404 (step 1412). Upon receiving this response, the registration request processing part 102-2 sends the registration confirmation data to the provision apparatus 102-3 as a response to the registration request of the step 1002 (step 1413). Similarly, upon receiving the response, the registration request processing part 305 of the provision apparatus 102-3 determines whether the registration confirmation data is identical with data generated thereby, and if determined identical, registers the deletion password "r_2Bif" into the attribute information holding part 309.

Figure 18:
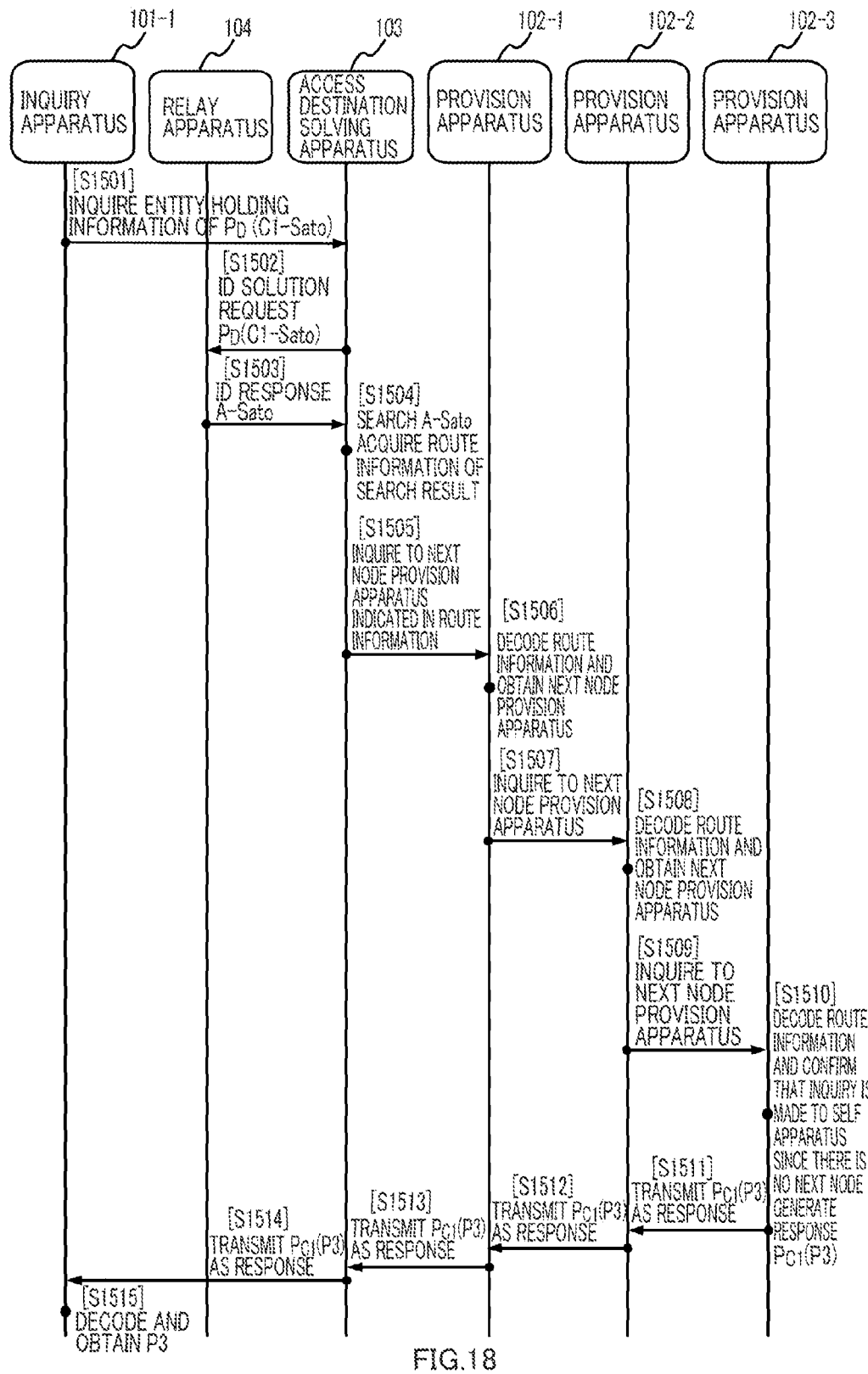
FIG. 18 is a sequence diagram showing an example 2 of an attribute information provision method according to the second embodiment.

Next, according to the second embodiment, an example of a processing where the inquiry apparatus 101 inquires the provision apparatus which is to be an inquiry destination of the attribute information to the access destination solving apparatus 103, and the access destination solving apparatus 103 and the provision apparatus 102 respond to the inquiry by using information stored in the provision apparatus response data holding part 409 is described. FIG. 18 is a sequence diagram showing an example 2 of the attribute information provision method according to the second embodiment. First, this processing is executed by the inquiry apparatus 101, for example, at the timing when an inquiry request of a user is made, for example, from the apparatus user or the operation system via the I/O unit 203.

That is, the inquiry destination inquiry processing part 205 of the inquiry apparatus 101 starts the processing upon receiving a user ID of the inquiry target from the I/O device 203 via the control part 207. In this case, the inquiry destination inquiry processing part 205 of the inquiry apparatus 101 generates the access destination solution request based on the user ID acquired from the I/O unit 203 and requests to the access destination solving apparatus 103 (step 1501). Specifically, the inquiry destination inquiry processing part 205 generates information "$P_D$(C1-Sato)" by encrypting the user ID "C1-Sato" with a public key of the relay apparatus 104 and transmits the information to the access destination solving apparatus 103.

On the other hand, upon receiving the access destination solution request, the access destination solution feature 103 makes ID solution request to the relay apparatus 104 (step 1502). Meanwhile, the user ID conversion processing unit 506 of the relay apparatus 104 performs decoding processing for the ID solution request by using a private key thereof stored in the private key and certificate holding part 509, and sends the decoding result as a response to the access destination solving apparatus 103 (step 1503). Specifically, the user ID conversion processing part 506 decodes "$P_D$(C1-Sato)" indicated by the ID solution request into "C1-Sato", converts "C1-Sato" into "A-Sato" by using information stored in the user ID conversion information holding part 508 and responds to the access apparatus solution device 103.

Next, the access destination solving apparatus 103 searches in the table 760 (see FIG. 16) stored in the provision apparatus response data holding part 409 with the user ID and obtains the route information (step 1504). Specifically, the access destination solving apparatus 103 searches the table 760 of FIG. 16 with "A-Sato" and obtains the route information "P1, $P_{P1}$(P2, $P_{P2}$(P3, $P_{P3}$(belonging)))".

Next, the access destination solving apparatus 103 transmits an access destination solution request including the route information obtained in the step 1504 to the next node provision apparatus whose information is indicated in the route information obtained in the step 1504 (step 1505). Specifically, the access destination solving apparatus 103 transmits the route information "$P_{P1}$(P2, $P_{P2}$(P3, $P_{P3}$(belonging)))" to the provision apparatus 102-1 which is "P1".

Next, the solution processing response processing part 306 of the provision apparatus 102-1 receives the access destination solution request including the route information via the communication unit 304 and the control part 308, decodes the access destination solution request by using a private key stored in the private key and certificate holding part 312, and obtains the route information of a provision apparatus which serves as a next correspondent (step 1506). Specifically, the solution processing response processing part 306 decodes "$P_{P1}$(P2, $P_{P2}$(P$^3$, $P_{P3}$(belonging)))" and obtains "P2, $P_{P2}$(P3, $P_{P3}$(belonging))".

Next, the provision apparatus 102-1 transmits an access destination solution request including the route information to the next node provision apparatus according to the route information acquired as above (step 1507). Specifically, the provision apparatus 102-1 transmits the route information "$P_{P2}$(P3, $P_{P3}$(belonging))" to the provision apparatus 102-2 which is "P2". The provision apparatus 102-2 acquires the next node provision apparatus from the route information in the same manner as the provision apparatus 102-1 (step 1508) and transmits an access destination solution request including the route information to the acquired next node provision apparatus (step 1509). Specifically, the provision apparatus 102-2 decodes "$P_{P2}$(P3, $P_{P3}$(belonging))" and obtains "P3, $P_{P3}$(belonging)", and transmits "$P_{P3}$(belonging)" of the route information to the provision apparatus 102-3.

Next, the provision apparatus 102-3 decodes the access destination solution request in the same manner as the provision apparatus 102-1 and obtains "belonging" as a correspondent provision apparatus. Thus, since it may be determined that the self apparatus is a correspondent provision apparatus, the provision apparatus 102-3 generates a response message (step 1510). Specifically, the provision apparatus 102-3 decodes "$P_{P3}$(belonging)" and acquires "belonging", and generates "$P_{C1}$(P3)" which is an identifier indicating thereof and encrypted with a public key of the inquiry apparatus 101-1.

Next, the provision apparatus 102-3 transmits the generated response message as a response of the step 1509 (step 1511). Specifically, the provision apparatus 102-3 transmits "$P_{C1}$(P3)" to the provision apparatus 102-2.

Next, the provision apparatus 102-2 transmits the response message received from the provision apparatus 102-3 to the provision apparatus 102-1 as a response of the step 1507 (step 1512). Specifically, the provision apparatus 102-2 transmits "$P_{C1}$(P3)" to the provision apparatus 102-1. Similarly, the provision apparatus 102-1 transmits the response message received from the provision apparatus 102-2 to the access destination solving apparatus 103 as a response of the step 1505 (step 1513). Similarly, the access destination solving apparatus 103 transmits the received response message to the inquiry apparatus 101-1 as a response of the step 1501 (step 1514).

Next, the inquiry apparatus 101-1 performs decoding processing of the response message received from the access destination solving apparatus with a private key thereof held in the private key and certificate holding part 210 and obtains information of a correspondent provision apparatus. Specifically, the inquiry apparatus 101-1 decodes "$P_{C1}$(P3)" and obtains "P3".

Figure 19:
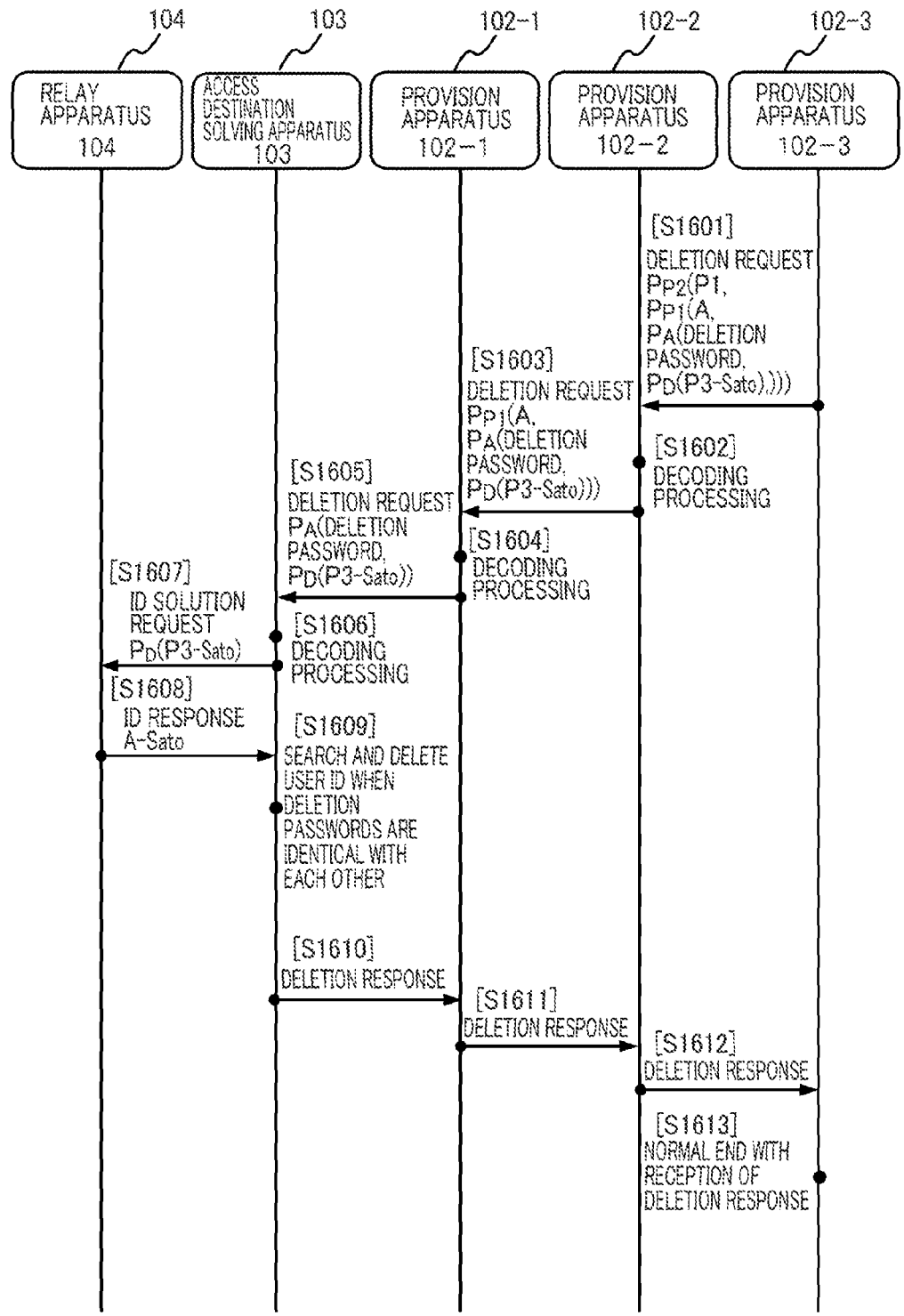
FIG. 19 is a sequence diagram showing an example 3 of an attribute information provision method according to the second embodiment.

Then, according to the second embodiment, an example of processing deleting data registered by the provision apparatus 102 and stored in the provision apparatus response data holding part 409 with the provision apparatus 102 is described. FIG. 19 is a sequence diagram showing an example 3 of the attribute information provision method according to the second embodiment. First, this processing is executed by the provision apparatus 102, for example, at the timing when a deletion request of a user is made, for example, from the apparatus user or the operation system via the I/O unit 303. That is, the deletion request processing part 307 starts the processing upon receiving a user ID of the deletion target from the I/O device 303 via the control part 308.

In this case, the deletion request processing part 307 of the provision apparatus 102-3 searches in the table 710 (see FIG. 8) stored in the attribute information holding part 309 with the user ID acquired from the I/O unit 303, acquires a corresponding deletion password, and further selects any other provision apparatus from the certificate stored in the private key and certificate holding part 312 and generates the deletion request (step 1601). Specifically, the deletion request processing part 307 searches the table 710 of FIG. 8 with the user ID "P3-Sato" as a key and obtains the deletion password "r_2Bif". Then, the deletion request processing part 307 generates "$P_{P2}$(P1, $P_{P1}$(A, PA(r_2Bif, $P_D$(P3-Sato))))" as a deletion request.

Next, upon receiving the deletion request from the provision apparatus 102-3, deletion request processing part 307 of the provision apparatus 102-2 decodes the deletion request by using a private key thereof stored in the private key and certificate holding part 312 (step 1602), identifies a next correspondent provision apparatus, and transmits the decoded deletion key to the provision apparatus (step 1603). Specifically, the provision apparatus 102-2 decodes "$P_{P2}$(P1, $P_{P1}$(A, $P_A$(r_2Bif, $P_D$(P3-Sato))))", acquires "P1" as a next correspondent provision apparatus, obtains "$P_{P1}$(A, $P_A$(r_2Bif), $P_D$(P3-Sato)))" as a deletion request, and sends this to the provision apparatus 102-1.

Upon receiving the deletion request from the provision apparatus 102-2, the provision apparatus 102-1 decodes the deletion request in the same manner as the provision apparatus 102-2 (step 1604), then identifies a next correspondent, and sends the deletion request to the next correspondent (step 1605). Specifically, the provision apparatus 102-1 acquires "A" as a next correspondent by decoding "$P_{P1}$(A, $P_A$(r_2Bif, $P_D$(P3-Sato)))", obtains "$P_A$(r_2Bif), $P_D$(P3-Sato))" as a deletion request, and sends the deletion request to the access destination solving apparatus 103.

Next, upon receiving the deletion request, the access destination solving apparatus 103 decodes the deletion request in the same manner as the provision apparatus 102-2 (step 1606), acquires the deletion password and the encrypted user ID, and sends the ID solution request to the relay apparatus 104 (step 1607). On the other hand, the relay apparatus 104 performs ID conversion in the same manner as in the first embodiment and sends a converted ID (step 1608) as a response to the access destination solving apparatus 103. Specifically, the relay apparatus 104 acquires "P3-Sato" by decoding "$P_D$(P3-Sato)", performs ID conversion, and sends the converted ID as a response to the access destination solving apparatus 103.

Upon receiving the response from the relay apparatus 104, the access destination solving apparatus 103 searches in a table 760 held in the response data holding part with the user ID or the response, and when the deletion password obtained as a search result is identical with the deletion password included in the deletion request, deletes the corresponding route information from the table 760 (step 1609). Specifically, the access destination solving apparatus 103 acquires the deletion password "r_2Bif" by searching in the table 760 of FIG. 16 with "A-Sato", and when this is identical with the deletion password included in the deletion request is identical, deletes the route information in the table 760.

Next, the access destination solving apparatus 103 performs deletion response to the deletion request of the step 1605 (step 1610). Upon receiving the deletion response, the provision apparatus 102-1 performs deletion response as a response of the step 1603 (step 1611), and similarly, the provision apparatus 102-2 receiving the deletion response performs deletion response as a response of the step 1601 (step 1612). Upon receiving the deletion response, the provision apparatus 102-3 confirms from the deletion response that deletion processing has completed properly (step 1613). The second embodiment of the present invention is described as above.

According to the second embodiment, the access destination solving apparatus 103 in the attribute information provision system 10 holds the correspondence relationship between the user and the provision apparatus 102 by encrypting with a public key corresponding to a private key held by the other provision apparatus. Thus, the correspondence relationship between the user and the provision apparatus 102 cannot be acquired by the access destination solving apparatus 103 only, and the inquiry request may be sent as a response with the correspondence relationship between the user and the provision apparatus 102 when sequentially decoded by other provision apparatuses. Similarly with the first embodiment, the second embodiment has advantageous effects of preventing an unauthorized action at the time of registration or deletion or an unauthorized deletion when a table is leaked. Also, each provision apparatus 102 needs not to have a table.

In the registration processing of the second embodiment, a provision apparatus of the registered route information and a provision apparatus used for registration are the same, that is, the provision apparatus 102-1 and the provision apparatus 102-2 are the same. However, a provision apparatus of the route information corresponding to the communication path and a provision apparatus to be registered may be different from each other. Similarly with the first embodiment, the number of provision apparatuses included in the route information and the number of provision apparatuses used for registration, inquiry and deletion may be changed to a desired number.

Figure 21:
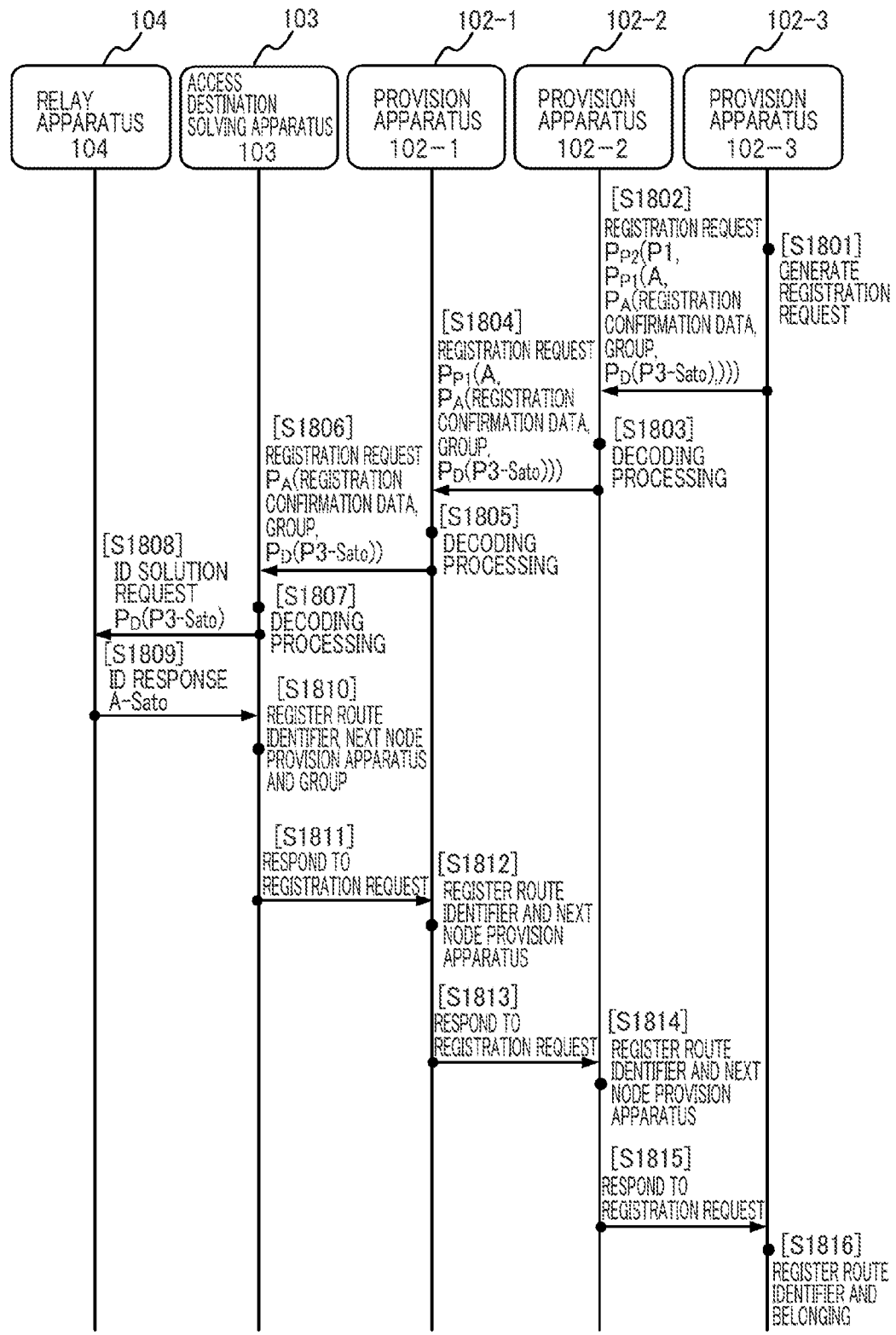
FIG. 21 is a sequence diagram showing an example 1 of an attribute information provision method according to the third embodiment.

Next, a third embodiment is described with reference to FIG. 20 to FIG. 22. A difference of the third embodiment from the first embodiment is that registration date, deletion date and group are also managed in the data held by the provision apparatus response data holding part 409 of the access destination solving apparatus 103 illustrated in the table 700 of FIG. 7. The group represents that what kind of organization is the organization that uses the provision apparatus 102. For example, when the provision apparatus 102 is used by city A, Town B and Village C, such organizations are referred to as a local government group, and when the provision apparatus 102 is used by Hospital a, Hospital B and Hospital y, such organizations are referred to as a medical institution group. It is assumed that the group information is communicated in advance from an organization managing the access destination solving apparatus 103 to an organization using the provision apparatus 102. With this difference, even when multiple organizations register information of a predetermined person, only a necessary provision apparatus may be sent as a response by designating the group at the time of inquiry request and thereby the inquiry request can be made by designating the time.

FIG. 20 is a diagram showing a data configuration example of a table 770 stored in the provision apparatus response data holding part 409 of the access destination solving apparatus 103. In the third embodiment, the table 770 held by the provision apparatus response data holding part 409 stores the value of the registration date, deletion date and group in addition to the user ID, the route identifier, the deletion password and the next node provision apparatus.

Next, a processing where the provision apparatus 102 registers the user ID corresponding to the attribute information held thereby into the access destination solving apparatus 103 while routing through other provision apparatuses is described. FIG. 21 is a sequence diagram showing an example 1 of the attribute information provision method according to the third embodiment. Here, similarly with the first embodiment, a processing where the provision apparatus 102-3 registers information into the access destination solving apparatus 103 while routing through the provision apparatus 102-2 and the provision apparatus 102-1 is described as an example.

When generating the registration request, the provision apparatus 102-3 randomly selects a provision apparatus and generates registration confirmation data and the deletion password in the same manner as the step 1001, and further generates the registration request by adding the group thereof (step 1801). Specifically, "$P_{P2}(P1, P_{P1}(A, P_A(\text{registration confirmation data}, r\_2\text{Bif}, \text{local government}, P_D(P3\text{-Sato}))))$" with the local government as the group added to the registration request illustrated in the first embodiment is generated.

Next, similarly with steps 1002 to 1009, registration request, decoding processing and ID solution are performed in the provision apparatus 102-2, the provision apparatus 102-1, the access destination solving apparatus 103 and the relay apparatus 104 similarly with the first embodiment (steps 1802 to 1809). Next, upon receiving the ID response, the access destination solving apparatus 103 stores the value of the route identifier, the next node provision apparatus and the group obtained up to the step 1809 into the provision apparatus response data holding part 409 (step 1810). Specifically, the access destination solving apparatus 103 registers the user ID "A-Sato", the route identifier "Route1", the deletion password "r_2Bif", the next node provision apparatus "P1" and the group "local government".

Following the registration, the access destination solving apparatus 103 sends a response of the registration request to the provision apparatus 102-1, the provision apparatus 102-1 sends a response of the registration request to the provision apparatus 102-2, and the provision apparatus 102-2 sends a response of the registration request to the provision apparatus 102-3 (steps 1811 to 1815). Upon receiving such responses of the registration request, the provision apparatus 102-3 registers the route identifier and "belonging" and ends processing (step 1816).

At the time of inquiry, the inquiry apparatus 101 transmits the value of date and group along with the user ID to the access destination solving apparatus 103. On the other hand, upon receiving the inquiry request, the access destination solving apparatus 103 searches in the table 770 of FIG. 20 held in the provision apparatus response data holding part 409 with the user ID and group of the inquiry request as keys, and when date indicated in the inquiry request is between "registration date" and "deletion date", the access destination solving apparatus 103 performs inquiry to the next node provision apparatus similarly with the sequence of FIG. 14. The third embodiment of the present invention is described as above.

According to the third embodiment, in the attribute information provision system 10 in which the access destination solving apparatus 103 sends a provision apparatus in response to a request of the inquiry apparatus 101 without holding a table of the correspondence relationship between the user and the provision apparatus 102, even when personal information is registered in multiple provision apparatuses, only a necessary provision apparatus can be sent as a response by designating the group at the time of inquiry, and thereby inquiry request can be made by designating the time. Although the difference of the third embodiment is discussed based on the first embodiment, the difference also may be implemented by adding the value of "registration date", "deletion date", and "group" to the table 760 of FIG. 16 in the second embodiment. In the third embodiment, an example of adding information of the group into the row of group is shown in the table 770 of FIG. 20. However, a table may be generated for each group.

Figure 24:
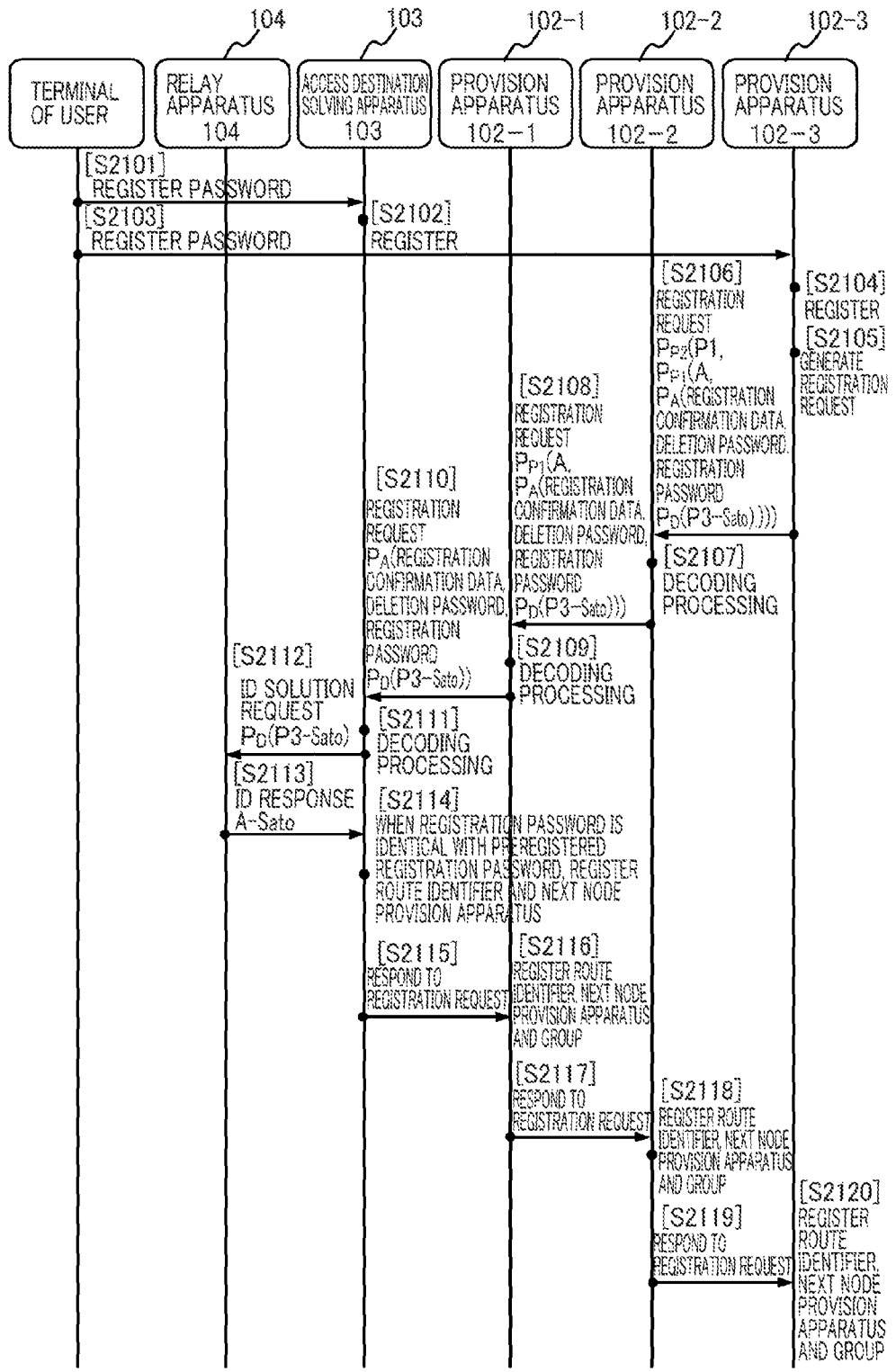
FIG. 24 is a sequence diagram showing an example of an attribute information provision method according to the fourth embodiment.

Next, a fourth embodiment of the present invention is described with reference to FIG. 22 to FIG. 24. A difference of the fourth embodiment from the first embodiment is that when the provision apparatus 102 registers a user ID corresponding to attribute information held by the provision apparatus 102, the provision apparatus 102 registers based on authorization of the registration target user, and the access destination solving apparatus 103 performs registration processing after confirming authorization of the registration target user. The difference prevents the provision apparatus 102 from registering without authorization of the user.

Figure 22:
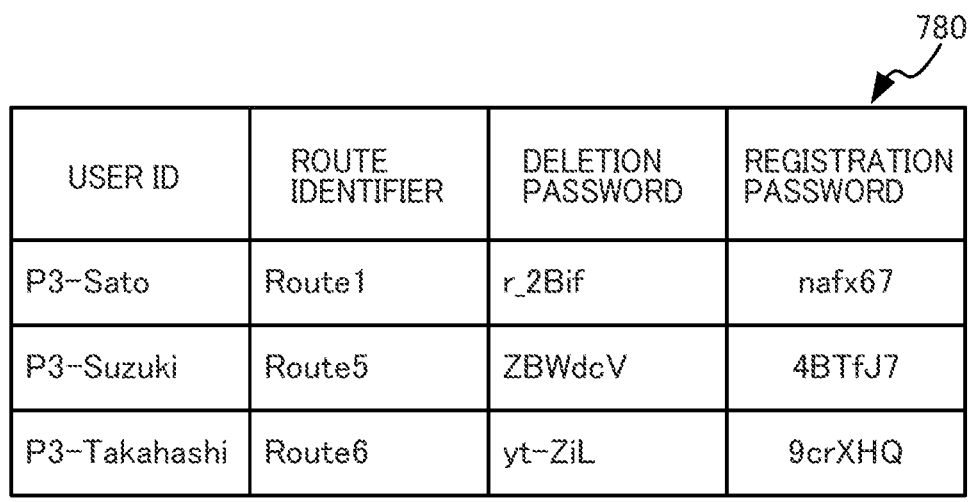
FIG. 22 is a diagram showing a configuration example of a table stored in an attribute information holding part according to a fourth embodiment.

FIG. 22 is an example of a table 780 held by the attribute information holding part 309 in the provision apparatus 102 according to the fourth embodiment. In the example of the table 780, the registration password in addition to the user ID, the route identifier, the deletion password, and the next node provision apparatus illustrated in the table 710 of FIG. 8 are held. Out of such information, the registration password is information that the user may determine as desired and may be disclosed to the access destination solving apparatus 103 and only an authorized provision apparatus 102 out of provision apparatuses holding information thereof. In addition to this data, the attribute information holding part 309 holds a table that stores personal attribute information such as illustrated in the table 720 of FIG. 9 similarly with the table 710 of FIG. 8.

FIG. 23 is a diagram showing an example of a table 790 stored in the provision apparatus response data holding part 409 of the access destination solving apparatus 103. The table 790 stores the registration password in addition to the user ID, the route identifier, the deletion password, and the next node provision apparatus illustrated in the table 700 of FIG. 7.

Then, an example of a processing where the provision apparatus 102 registers information of the user into the access destination solving apparatus 103 based on authorization of the user by using the registration password is described. FIG. 24 is a sequence diagram showing an example of the attribute information provision method according to the fourth embodiment. First, the user generates a registration password which is only disclosed to the user. Then, the user makes registration request of the password to the access destination solving apparatus 103 by using a predetermined terminal (step 2101).

On the other hand, upon receiving the registration request, the access destination solving apparatus 103 registers the registration password into the response data holding part 409 (step 2102). Specifically, the user holding the user ID "A-Sato" accesses to the access destination solving apparatus 103, for example, from a terminal thereof by using the network 105 and the like, and registers "nafx67" into the table 790 of FIG. 23 as a registration password.

Next, the user makes registration request of the registration password to the provision apparatus 102-3 by using the predetermined terminal (step 2103). On the other hand, upon receiving the registration request, the provision apparatus 102-3 stores the registration password into the attribute information holding part 309. Specifically, the user holding the user ID "P3-Sato" accesses to the access destination solving apparatus 103, for example, from a terminal thereof by using the network 105 and the like, and registers "nafx67" into the table 780 of FIG. 22 as a registration password. (Step 2104) Next, the provision apparatus 102-3 generates the registration request similarly with the first embodiment. At that time, information of the registration password encrypted with a public key of the access destination solving apparatus 103 is added to items of the registration request according to the first embodiment. Specifically, when the provision apparatus 102-1 and the provision apparatus 102-2 are randomly selected similarly with the first embodiment, the provision apparatus 102-3 generates the registration request "$P_{P2}(P1, P_A(\text{registration confirmation data}, r\_2Bif, nafx67, P_D(P3-Sato))))$".

Next, similarly with steps 1002 to 1009 of the first embodiment, the provision apparatus 102-3 performs the registration request to the access destination solving apparatus 103 via the provision apparatus 102-2 and the provision apparatus 102-1, meanwhile the access destination solving apparatus 103 performs ID solution request to the relay apparatus 104 (step 2106 to step 2113). The access destination solving apparatus 103 receives the result of ID solution in response to the ID solution request from the relay apparatus 104, and when a registration password corresponding to an ID registered in the response data holding part 409 is identical with a registration password included in the registration request, generates the route identifier and registers the route identifier and the next node provision apparatus into the response data holding part 409. (Step 2114) Specifically, the access destination solving apparatus 103 acquires "a-Sato" from the relay apparatus 104 as the result of ID solution, searches in the table 790 of FIG. 23 with the acquired ID, and obtains "nafx67" as a registration password. Since "nafx67" is the same information as the information indicated in the registration request, the access destination solving apparatus 103 generates "Route1" as the route identifier, and adds into the table 790 of FIG. 23 along with "P1" being the next node provision apparatus. Then, similarly with step 1011 to step 1016 of the first embodiment, response processing of the registration request is performed in the order of the access destination solving apparatus 103, provision apparatus 102-1, provision apparatus 102-2, and provision apparatus 102-3, and the processing ends. The fourth embodiment of the present invention is described as above.

According to the fourth embodiment, in a system where the access destination solving apparatus 103 in the attribute information provision system 10 sends a provision apparatus in response to a request of the introduction dispatch without holding a table of the correspondence relationship between the user and the provision apparatus 102, the user may register information of the correspondence relationship between the user and the provision apparatus 102 into the access destination solving apparatus 103 based on the authorization. Although the fourth embodiment is described based on the difference from the first embodiment, the fourth embodiment may be implemented by adding the registration password to the table 760 of FIG. 16 of the second embodiment. Although an example of registering the registration password by the user using the terminal is shown, registration request may be made by notifying an organization using the provision apparatus 102-3 of the registration password with a paper medium or the like and the user of the provision apparatus 102-3 may register the registration password into the table 780 of FIG. 22.

Best modes for carrying out the present invention are described specifically as above; however, the present invention is not limited thereto and may be modified in various ways within a scope not deviating from the spirit thereof.

According to the embodiments, in a user attribute information provision system in which multiple information processing apparatuses operate in coordination with each other, the leakage of attribute information may be prevented by concealing the correspondence relationship between the user and an information providing entity which holds attribute information thereof when performing various processings related to the user's attribute information.

According to the descriptions of the specification, at least following is disclosed. That is, it may be allowed to be that the attribute information provision method according to the present embodiment, wherein the access destination solving apparatus performs the processing of storing information in response to the information registration request by: generating an identifier unique to the information registration request; storing the identifier unique into the storage device while associating the identifier unique with the information of the user indicated by the information registration request and an identifier indicating the correspondent provision apparatus; and returning the identifier unique to the information registration request to the correspondent provision apparatus as a response to the information registration request, wherein each provision apparatus included in the apparatus group forming the communication path acquires the identifier unique to the information registration request from the response to the information registration request, stores, into a storage device, a combination of the unique identifier and the identifier of the correspondent provision apparatus in the communication path to which the provision apparatus belongs when transferring the information registration request, and transfers the response to the correspondent provision apparatus in the communication path, and upon receiving of the inquiry request from the inquire apparatus, the access destination solving apparatus performs processings of: searching the storage device for the unique identifier registered for the user and the identifier of the correspondent provision apparatus; and transmitting the unique identifier and the inquiry request to the correspondent provision apparatus to transfer the inquiry request byway of the correspondent provision apparatus to the provision apparatus as the inquiry destination via the provision apparatuses in the communication path corresponding to the unique identifier, thereby causing the provision apparatus as the inquiry destination to return the attribute information of the user to the inquiry apparatus via the provision apparatuses in the communication path.

Thus, when a processing of providing multiple kinds of attribute information for one user is supposed such as when attribute information of each user is managed respectively by multiple information providing entities, attribute information may be managed by associating with multiple communication paths. Therefore, attribute information provision may be controlled by flexibly responding to increase or decrease of provision apparatuses.

It may be allowed to be that the attribute information provision method according to the present embodiment, wherein in the processing of storing information in response to the information registration request, the access destination solving apparatus stores the identifier unique to the information registration request, the information of the user indicated by the information registration request, the identifier indicating the correspondent provision apparatus, and data deletion information included in the information registration request into the storage device while associating them with each other; any one of the provision apparatuses generates deletion request data including data deletion information and information of a deletion target user, newly selects an apparatus group forming a communication path, and transmits the deletion request data to the access destination solving apparatus via the selected apparatus group; the access destination solving apparatus receives the deletion request data, searches information held in the storage device to identify the information of the deletion target user indicated by the deletion request data, the identifier indicating a correspondent provision apparatus for the user, and the deletion information, and when the deletion information held in the storage device and the deletion information included in the deletion request data are identical with each other, deletes the information identified in the search from the storage device, and transmits the identifier unique to the information registration request and a deletion request to the correspondent provision apparatus identified in the search to transfer the deletion request data and the unique identifier to each provision apparatus in the communication path corresponding to the unique identifier; and each of the provision apparatuses having received the unique identifier and the deletion request data searches for the identifier indicating the correspondent provision apparatus, held in the provision apparatus, and associated with the unique identifier, transmits the unique identifier to the correspondent provision apparatus identified in the search, and then deletes the unique identifier and the identifier of the correspondent provision apparatus in the storage device thereof.

Thus, for example, when the user changes mind about attribute information provision and desires to delete various information on the user already registered in the access destination solving apparatus and the provision apparatuses, data deletion reliably based on real intention of the user may be performed and thereby occurrence of unauthorized data deletion or the like by a third party may be prevented.

It may be allowed to be that the attribute information provision method according to the present embodiment, wherein when generating and transmitting the information registration request, a request-sender provision apparatus that generates and transmits the information registration request performs: a first processing of generating first data by encrypting the information of the predetermined user being a registration target indicated by the information registration request with a public key of the access destination solving apparatus; a processing of selecting, from the apparatus group, a first provision apparatus whose correspondent is the request-sender provision apparatus, and a second provision apparatus whose correspondent is the first provision apparatus in the apparatus group; and a second processing of generating the information registration request by encrypting the first data and identifiers of the second provision apparatus and the access destination solving apparatus, and transmits the generated information registration request to the first provision apparatus, wherein the first provision apparatus receives the information registration request from the request-sender provision apparatus, decodes the identifier of the second provision apparatus included in the second data by applying a private key of the first provision apparatus to the information registration request, and transmits the first data included in the information registration request to the provision apparatus identified by the identifier of the second provision apparatus, the second provision apparatus receives the first data from the first provision apparatus, decodes the identifier of the access destination solving apparatus included in the first data by applying a private key of the second provision apparatus to the first data, and transmits the first data and the identifier the second provision apparatus to the access destination solving apparatus, and in the processing of storing the information in response to the information registration request, the access destination solving apparatus receives the first data and the identifier of the second provision apparatus from the second provision apparatus, acquires the information of the predetermined user included in the first data by applying a private key of the access destination solving apparatus to the first data, and stores the identifier of the second provision apparatus as information of a correspondent of the access destination solving apparatus into the storage device while associating the identifier of the second provision apparatus with the information of the predetermined user.

Thus, the leakage of confidential information such as the relation between the user and the storage destination of attribute information thereof may be prevented in a reliable manner by limiting information which is recognizable by a provision apparatus only to data transmission destination among provision apparatuses or in the communication path where attribute information is passed.

It may be allowed to that the attribute information provision method according to the present embodiment, wherein in the first processing of generating the first data, the request-sender provision apparatus generates the first data by encrypting the information of the predetermined user being a registration target indicated by the information registration request and data deletion information to be used to delete the information of the predetermined user with a public key of the access destination solving apparatus, and in the processing of storing information in response to the information registration request, the access destination solving apparatus receives the first data and the identifier of the second provision apparatus from the second provision apparatus, acquires the information of the predetermined user included in the first data and the data deletion information by applying a private key of the access destination solving apparatus to the first data, and stores the identifier of the second provision apparatus as information of a correspondent of the access destination solving apparatus into the storage device by associating the identifier of the second provision apparatus with the information of the predetermined user and the deletion information.

Thus, data deletion reliably based on real intention of the user may be performed in a secure manner, and other occurrence of unauthorized data deletion by a third party may be prevented in a more reliable manner.

It may be allowed to be that the attribute information provision method according to the present embodiment, wherein in the processing of storing information in response to the information registration request, the access destination solving apparatus transmits a conversion request including an identifier being the information of the user indicated by the information registration request to a relay apparatus configured to convert an identifier of a user between information processing apparatuses, acquires, from the relay apparatus, an identifier converted from the identifier of the user indicated by the information registration request, the converted identifier being the identifier indicating the user in the access destination soling device, and stores the converted identifier of the user and the information of the correspondent provision apparatus into the storage device, and upon receiving the inquiry request, the access destination solving apparatus performs a processing of: transmitting a conversion request including the identifier of the predetermined user indicated by the inquiry request to the relay apparatus; acquiring, from the delay device, an identifier converted from the identifier of the predetermined user indicated by the inquiry request, the converted identifier being the identifier indicating the user in the access destination solving apparatus; and transferring the inquiry request by way of the correspondent provision apparatus registered for the converted identifier of the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

Thus, a processing mode of communicating a real identifier of the user included in information originated by the inquiry apparatus in a form converted into kana or the like may be implemented without communicating to the access destination solving apparatus as is. Therefore, even when the leakage of various information on the user managed by the access destination solving apparatus occurs, it is very difficult to identify a real user, and thereby the secure level of a processing related to the attribute information provision may be improved.

It may be allowed to be that the attribute information provision method according to the present embodiment, wherein in a first processing of generating the first data, the request-sender provision apparatus generates first data by encrypting the information of the predetermined user being a registration target indicated by the information registration request and information of a group to which the request-sender provision apparatus belongs with a public key of the access destination solving apparatus; and in the processing of storing information in response to the information registration request, the access destination solving apparatus receives the first data and the identifier of the second provision apparatus from the second provision apparatus, acquires the information of the predetermined user and the information of the group included in the first data by applying a private key of the access destination solving apparatus to the first data, and stores the identifier of the second provision apparatus as information of a correspondent of the access destination solving apparatus into the storage device while associating the identifier of the second provision apparatus with the information of the predetermined user, the information of the group, and reception time of the information registration request, and upon receiving the inquiry request, the access destination solving apparatus searches the storage device to identify a correspondent provision apparatus matched in terms of the information of the predetermined user indicated by the inquiry request, inquiry target date, and a group of the inquiry request, transferring the inquiry request by way of the correspondent provision apparatus to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

Thus, for example, even when enormous provision apparatuses exist and there are many users whose attribute information is managed by such provision apparatuses, a target provision apparatus may be identified for each group of information providing entities managing the provision apparatus in an efficient manner, and thereby entire processing efficiency may be improved.

It may be allowed to be that the attribute information provision method according to the present embodiment, wherein after predetermined registration confirmation data related to the predetermined user is transmitted from a predetermined terminal to the access destination solving apparatus and a request-sender provision apparatus, in a first processing of generating the first data, the request-sender provision apparatus generates first data by encrypting the information of the predetermined user being a registration target indicated by the information registration request and the registration confirmation data acquired from the predetermined terminal with a public key of the access destination solving apparatus, and in the processing of storing information in response to the information registration request, the access destination solving apparatus receives the first data and the identifier of the second provision apparatus from the second provision apparatus, acquires the information of the predetermined user and the registration confirmation data included in the first data by applying the private key of the access destination solving apparatus to the first data, and when the registration confirmation data related to the predetermined user received from the predetermined terminal in advance and the registration confirmation data included in the first data of the information registration request are identical with each other, stores the identifier of the second provision apparatus as information of a correspondent of the access destination solving apparatus into the storage device by associating the identifier of the second provision apparatus with the information of the predetermined user and the registration confirmation data.

Thus, registration of the data by the access destination solving apparatus may be controlled reliably based on real intention of the user, and other occurrence of unauthorized data registration by a third party may be prevented in a reliable manner.

The invention claimed is:

1. An attribute information provision method, comprising:
by a provision apparatus configured to provide attribute information on a user of a predetermined entity,
selecting a plurality of provision apparatuses from other provision apparatuses on a network as an apparatus group forming a communication path of the attribute information by sequentially repeating data transfer through the provision apparatuses, and generating an information registration request in which information of a predetermined user is concealed in data recognizable only to a correspondent provision apparatus among the other provision apparatuses of the apparatus group; and
transmitting the information registration request via the apparatus group to an access destination solving apparatus configured to manage a communication path between the provision apparatus and an inquiry apparatus that is to use the attribute information, and,
by the access destination solving apparatus,
receiving the information registration request, and storing the information of the user indicated by the information registration request and information of a provision apparatus in the apparatus group that has transmitted the information registration request directly to the access destination solving apparatus and that is a correspondent in a subsequent processing related to the information registration request, into a storage device; and
receiving an inquiry request of a provision apparatus as an inquiry destination for attribute information of a predetermined user from the inquiry apparatus, and transferring the inquiry request by way of the correspondent provision apparatus registered for the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

2. The attribute information provision method according to claim 1, wherein the access destination solving apparatus performs the processing of storing information in response to the information registration request by:

generating an identifier unique to the information registration request;

storing the identifier unique into the storage device while associating the identifier unique with the information of the user indicated by the information registration request and an identifier indicating the correspondent provision apparatus; and returning the identifier unique to the information registration request to the correspondent provision apparatus as a response to the information registration request, wherein each provision apparatus included in the apparatus group forming the communication path acquires the identifier unique to the information registration request from the response to the information registration request, stores, into a storage device, a combination of the unique identifier and the identifier of the correspondent provision apparatus in the communication path to which the provision apparatus belongs when transferring the information registration request, and transfers the response to the correspondent provision apparatus in the communication path, and upon receiving of the inquiry request from the inquire apparatus, the access destination solving apparatus performs processings of: searching the storage device for the unique identifier registered for the user and the identifier of the correspondent provision apparatus; and transmitting the unique identifier and the inquiry request to the correspondent provision apparatus to transfer the inquiry request by way of the correspondent provision apparatus to the provision apparatus as the inquiry destination via the provision apparatuses in the communication path corresponding to the unique identifier, thereby causing the provision apparatus as the inquiry destination to return the attribute information of the user to the inquiry apparatus via the provision apparatuses in the communication path.

3. The attribute information provision method according to claim 2, wherein in the processing of storing information in response to the information registration request, the access destination solving apparatus stores the identifier unique to the information registration request, the information of the user indicated by the information registration request, the identifier indicating the correspondent provision apparatus, and data deletion information included in the information registration request into the storage device while associating them with each other;

anyone of the provision apparatuses generates deletion request data including data deletion information and information of a deletion target user, newly selects an apparatus group forming a communication path, and transmits the deletion request data to the access destination solving apparatus via the selected apparatus group;

the access destination solving apparatus receives the deletion request data, searches information held in the storage device to identify the information of the deletion target user indicated by the deletion request data, the identifier indicating a correspondent provision apparatus for the user, and the deletion information, and when the deletion information held in the storage device and the deletion information included in the deletion request data are identical with each other, deletes the information identified in the search from the storage device, and transmits the identifier unique to the information registration request and a deletion request to the correspondent provision apparatus identified in the search to transfer the deletion request data and the unique identifier to each provision apparatus in the communication path corresponding to the unique identifier; and each of the provision apparatuses having received the unique identifier and the deletion request data searches for the identifier indicating the correspondent provision apparatus, held in the provision apparatus, and associated with the unique identifier, transmits the unique identifier to the correspondent provision apparatus identified in the search, and then deletes the unique identifier and the identifier of the correspondent provision apparatus in the storage device thereof.

4. The attribute information provision method according to claim 1, wherein when generating and transmitting the information registration request, a request-sender provision apparatus that generates and transmits the information registration request performs:

a first processing of generating first data by encrypting the information of the predetermined user being a registration target indicated by the information registration request with a public key of the access destination solving apparatus;

a processing of selecting, from the apparatus group, a first provision apparatus whose correspondent is the request-sender provision apparatus, and a second provision apparatus whose correspondent is the first provision apparatus in the apparatus group; and a second processing of generating the information registration request by encrypting the first data and identifiers of the second provision apparatus and the access destination solving apparatus, and transmits the generated information registration request to the first provision apparatus, wherein the first provision apparatus receives the information registration request from the request-sender provision apparatus, decodes the identifier of the second provision apparatus included in the second data by applying a private key of the first provision apparatus to the information registration request, and transmits the first data included in the information registration request to the provision apparatus identified by the identifier of the second provision apparatus, the second provision apparatus receives the first data from the first provision apparatus, decodes the identifier of the access destination solving apparatus included in the first data by applying a private key of the second provision apparatus to the first data, and transmits the first data and the identifier in the second provision apparatus to the access destination solving apparatus, and in the processing of storing the information in response to the information registration request, the access destination solving apparatus receives the first data and the identifier of the second provision apparatus from the second provision apparatus, acquires the information of the predetermined user included in the first data by applying a private key of the access destination solving apparatus to the first data, and stores the identifier of the second provision apparatus as information of a correspondent of the access destination solving apparatus into the storage device while associating the identifier of the second provision apparatus with the information of the predetermined user.

5. The attribute information provision method according to claim 4, wherein in the first processing of generating the first data, the request-sender provision apparatus generates the first data by encrypting the information of the predetermined user being a registration target indicated by the information registration request and data deletion information to be used to delete the information of the predetermined user with a public key of the access destination solving apparatus, and in the processing of storing information in response to the information registration request, the access destination solving apparatus receives the first data and the identifier of the second provision apparatus from the second provision apparatus, acquires the information of the predetermined user included in the first data and the data deletion information by applying a private key of the access destination solving apparatus to the first data, and stores the identifier of the second provision apparatus as information of a correspondent of the access destination solving apparatus into the storage device by associating the identifier of the second provision apparatus with the information of the predetermined user and the deletion information.

6. The attribute information provision method according to claim 1, wherein in the processing of storing information in response to the information registration request, the access destination solving apparatus transmits a conversion request including an identifier being the information of the user indicated by the information registration request to a relay apparatus configured to convert an identifier of a user between information processing apparatuses, acquires, from the relay apparatus, an identifier converted from the identifier of the user indicated by the information registration request, the converted identifier being the identifier indicating the user in the access destination soling device, and stores the converted identifier of the user and the information of the correspondent provision apparatus into the storage device, and upon receiving the inquiry request, the access destination solving apparatus performs a processing of: transmitting a conversion request including the identifier of the predetermined user indicated by the inquiry request to the relay apparatus; acquiring, from the delay device, an identifier converted from the identifier of the predetermined user indicated by the inquiry request, the converted identifier being the identifier indicating the user in the access destination solving apparatus; and transferring the inquiry request by way of the correspondent provision apparatus registered for the converted identifier of the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

7. The attribute information provision method according to claim 1, wherein in a first processing of generating the first data, the request-sender provision apparatus generates first data by encrypting the information of the predetermined user being a registration target indicated by the information registration request and information of a group to which the request-sender provision apparatus belongs with a public key of the access destination solving apparatus; and in the processing of storing information in response to the information registration request, the access destination solving apparatus receives the first data and the identifier of the second provision apparatus from the second provision apparatus, acquires the information of the predetermined user and the information of the group included in the first data by applying a private key of the access destination solving apparatus to the first data, and stores the identifier of the second provision apparatus as information of a correspondent of the access destination solving apparatus into the storage device while associating the identifier of the second provision apparatus with the information of the predetermined user, the information of the group, and reception time of the information registration request, and upon receiving the inquiry request, the access destination solving apparatus searches the storage device to identify a correspondent provision apparatus matched in terms of the information of the predetermined user indicated by the inquiry request, inquiry target date, and a group of the inquiry request, transferring the inquiry request by way of the correspondent provision apparatus to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

8. The attribute information provision method according to claim 1, wherein after predetermined registration confirmation data related to the predetermined user is transmitted from a predetermined terminal to the access destination solving apparatus and the request-sender provision apparatus, in a first processing of generating the first data, the request-sender provision apparatus generates first data by encrypting the information of the predetermined user being a registration target indicated by the information registration request and the registration confirmation data acquired from the predetermined terminal with a public key of the access destination solving apparatus, and in the processing of storing information in response to the information registration request, the access destination solving apparatus receives the first data and the identifier of the second provision apparatus from the second provision apparatus, acquires the information of the predetermined user and the registration confirmation data included in the first data by applying a private key of the access destination solving apparatus to the first data, and when the registration confirmation data related to the predetermined user received from the predetermined terminal in advance and the registration confirmation data included in the first data of the information registration request are identical with each other, stores the identifier of the second provision apparatus as information of a correspondent of the access destination solving apparatus into the storage device by associating the identifier of the second provision apparatus with the information of the predetermined user and the registration confirmation data.

9. An attribute information provision system comprising:
a provision apparatus including
  a communication unit configured to communicate with other devices,
  a storage unit configured to store attribute information on a user of a predetermined entity, and
  a processing unit configured to perform a processing of selecting a plurality of provision apparatuses from other provision apparatuses on a network as an apparatus group forming a communication path of the attribute information by sequentially repeating data transfer through the provision apparatuses, and generating an information registration request in which information of a predetermined user is concealed in data recognizable only to a correspondent provision apparatus among the other provision apparatuses of the apparatus group; and transmitting the information registration request via the apparatus group to an access destination solving apparatus configured to manage a communication path between the provision apparatus and an inquiry apparatus that is to use the attribute information; and
an access destination solving apparatus including
  a communication unit configured to communicate with other devices,
  a processing unit configured to perform
  a processing of receiving the information registration request from the provision apparatus, and storing information of the user indicated by the information registration request and information of a provision apparatus that has directly transmitted the information registration request to the provision apparatus out of the apparatus groups and that is a correspondent in subsequent processings related to the information registration request, into a storage device, and
  a processing of receiving an inquiry request of a provision apparatus as an inquiry destination for attribute information of a predetermined user from the inquiry apparatus, and transferring the inquiry request by way of the correspondent provision apparatus registered for the user to the provision apparatus as the inquiry destination via the provision apparatuses in the communication path including the correspondent provision apparatus, thereby causing the provision apparatus as the inquiry destination to return the attribute information of the user to the inquiry apparatus via the provision apparatuses in the communication path.

* * * * *